United States Patent
Wakamatsu

(10) Patent No.: US 8,873,942 B2
(45) Date of Patent: Oct. 28, 2014

(54) SHAKE COMPENSATION CONTROL APPARATUS, OPTICAL DEVICE, IMAGE CAPTURING APPARATUS, AND CONTROL METHOD OF SHAKE COMPENSATION

(75) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 13/490,783

(22) Filed: Jun. 7, 2012

(65) Prior Publication Data

US 2013/0004150 A1     Jan. 3, 2013

(30) Foreign Application Priority Data

Jul. 1, 2011   (JP) .................................. 2011-147527

(51) Int. Cl.
- G03B 17/00 (2006.01)
- G03B 5/02 (2006.01)
- H04N 5/232 (2006.01)
- G02B 27/64 (2006.01)

(52) U.S. Cl.
CPC ................ G02B 27/646 (2013.01); G03B 5/02 (2013.01); G03B 2205/0015 (2013.01); H04N 5/23212 (2013.01); H04N 5/23287 (2013.01); G03B 2217/005 (2013.01); H04N 5/23258 (2013.01)
USPC ........................................................... 396/55

(58) Field of Classification Search
CPC .................................................. H04N 5/2328
USPC ........................................................... 396/55
See application file for complete search history.

(56) References Cited

U.S. PATENT DOCUMENTS

| | | | |
|---|---|---|---|
| 5,561,485 A * | 10/1996 | Hamada et al. | 396/55 |
| 5,649,237 A | 7/1997 | Okazaki | |
| 7,218,457 B2 * | 5/2007 | Sensui | 359/686 |
| 2010/0013937 A1 | 1/2010 | Washisu et al. | |
| 2012/0113515 A1 * | 5/2012 | Karn et al. | 359/557 |

FOREIGN PATENT DOCUMENTS

| | | |
|---|---|---|
| JP | 7-225405 A | 8/1995 |
| JP | 2010-025962 A | 2/2010 |

* cited by examiner

*Primary Examiner* — Clayton E LaBalle
*Assistant Examiner* — Dennis Hancock
(74) *Attorney, Agent, or Firm* — Fitzpatrick, Cella, Harper & Scinto

(57) ABSTRACT

The image capturing apparatus detects a rotational shake and translational shake produced by an apparatus by a rotational velocity meter and an acceleration meter. A rotational shake compensation coefficient calculation unit calculates a compensation (correction) coefficient in relation to rotational shake. A translational shake compensation coefficient calculation unit calculates a compensation (correction) coefficient in relation to translational shake. When calculating the compensation amount in relation to rotational shake and translational shake using the respective compensation (correction) coefficients, the camera CPU acquires information indicating a degree of focus of the imaging optical system, and suppresses variation in the compensation amount by reducing the compensation (correction) coefficient when the degree of focus is low. A driving unit drives the shake compensation unit in accordance with the compensation amount relative to the rotational shake and the translational shake, thereby compensating for image shake in the imaging surface of the imaging optical system.

38 Claims, 14 Drawing Sheets

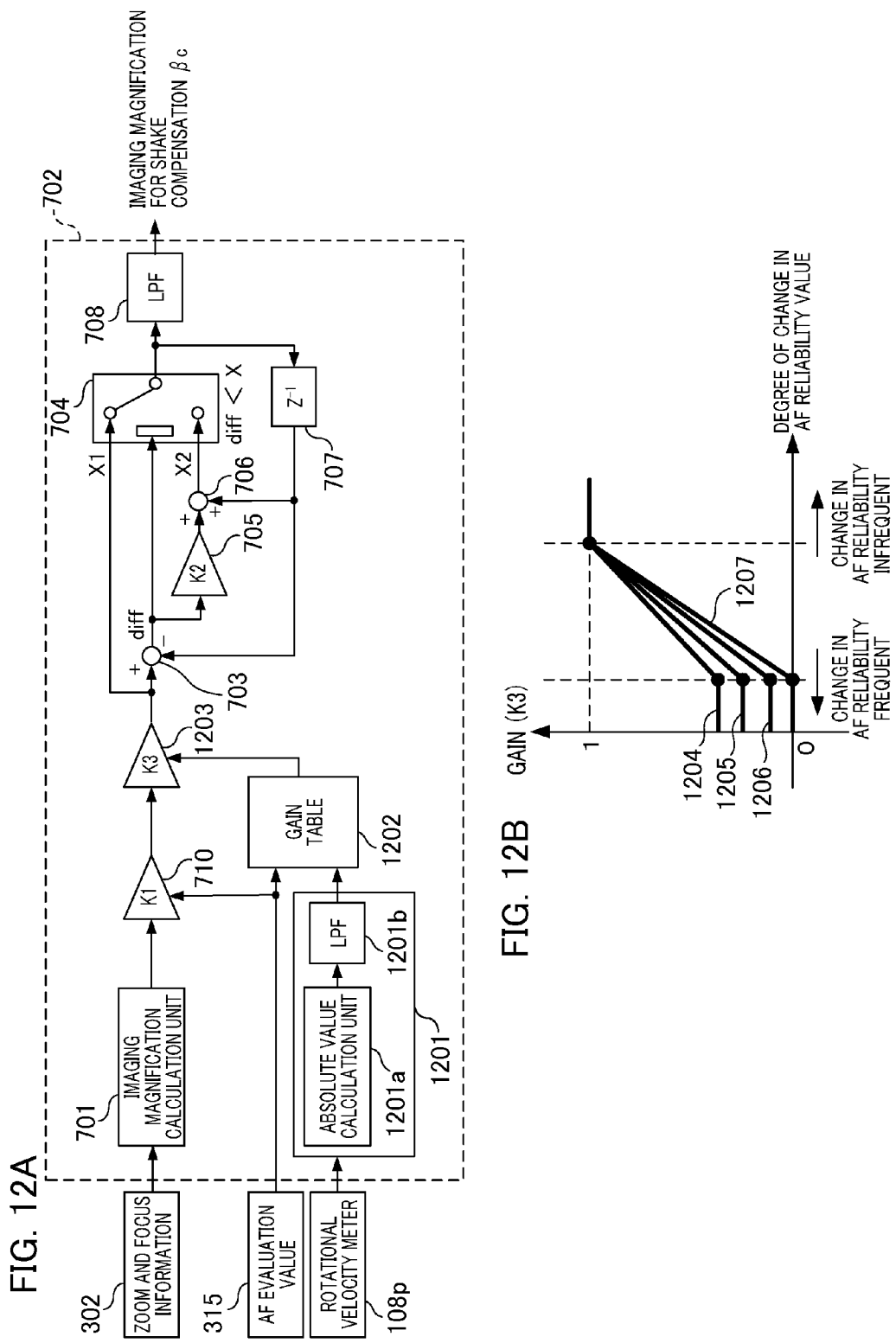

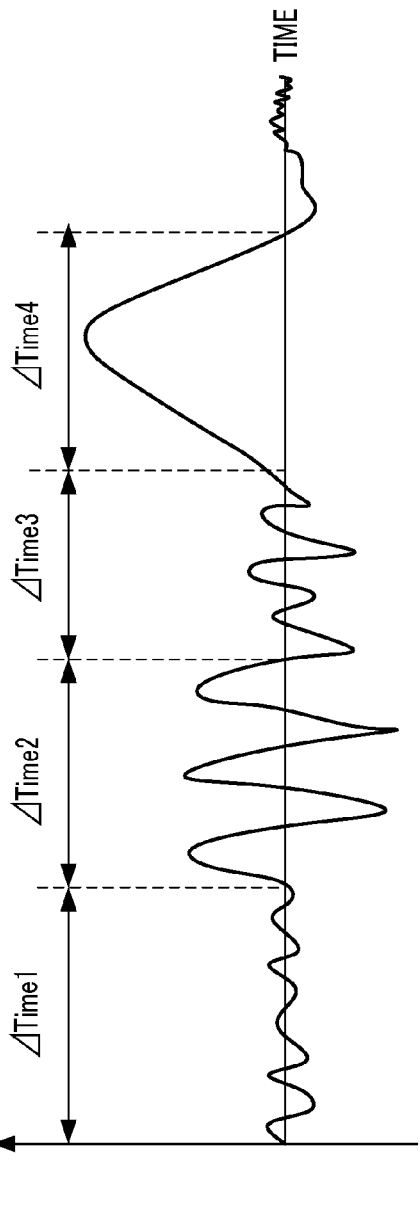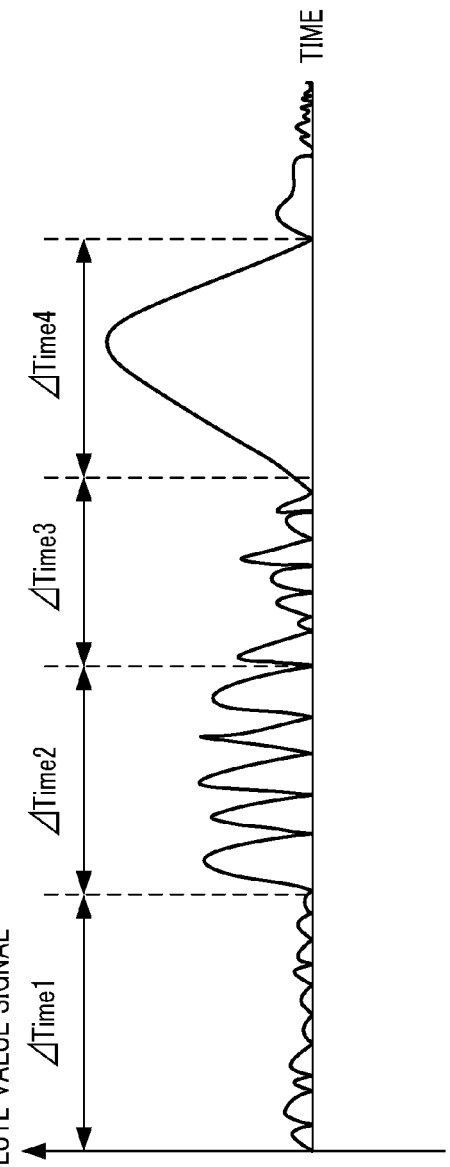

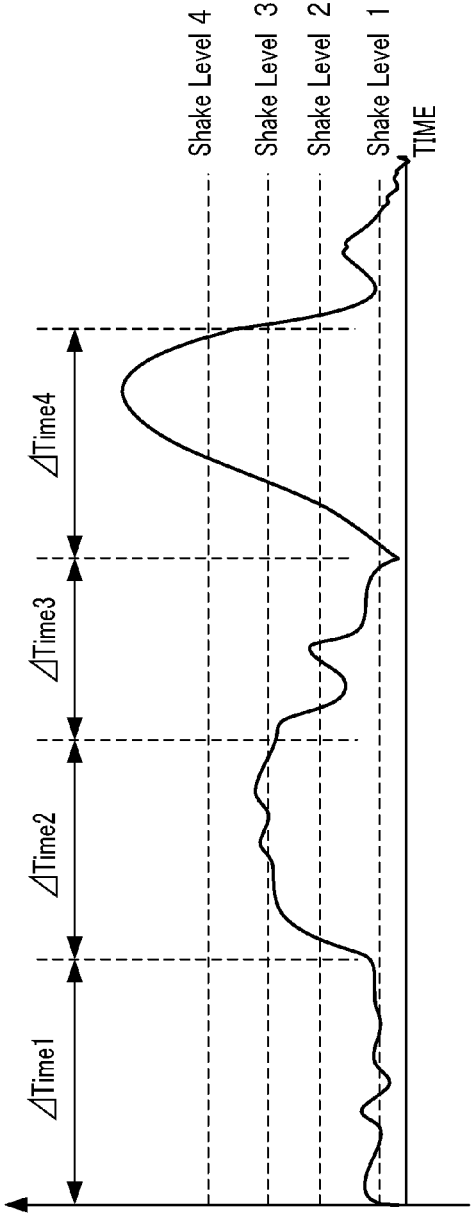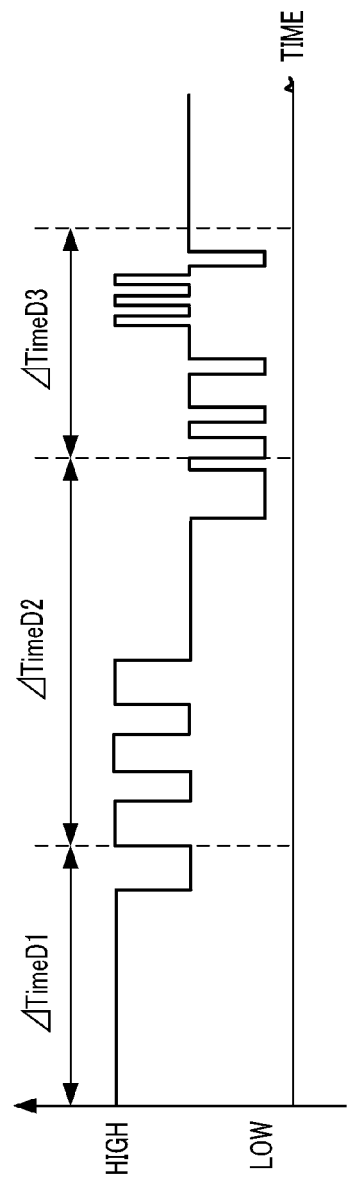
FIG. 13C  VARIATION STATE AMOUNT
FIG. 13D  AF RELIABILITY

SHAKE COMPENSATION CONTROL APPARATUS, OPTICAL DEVICE, IMAGE CAPTURING APPARATUS, AND CONTROL METHOD OF SHAKE COMPENSATION

BACKGROUND OF THE INVENTION

1. Field of the Invention

The present invention relates to a control technique of shake compensation configured to prevent image deterioration by compensating for image shake caused by vibration resulting from camera shake, or the like.

2. Description of the Related Art

All the principal imaging operations of contemporary cameras such as determining exposure, or focus adjustment have been automated. Furthermore a camera that includes a shake compensation control apparatus configured to prevent image shake due to camera shake or the like almost completely eliminates factors that result in an imaging error by a photographer.

In this context, a shake compensation control apparatus will be briefly described. Camera shake is normally characterized by a vibration having a frequency of 1 to 10 Hz. It is necessary to detect shaking (rotational shake) of the camera resulting from camera shake and move an image shake compensation lens (hereinafter referred to as a "shake compensation lens (image blur correction lens)") in response to a detection value in order to enable imaging that eliminates image shake even when camera shake occurs during shutter release. That process requires accurate detection of camera vibration and compensation of variation in the optical axis due to shaking. In principle, image shake can be suppressed by mounting a vibration detection unit configured to acquire a detection result such as the rotational velocity of the shaking and a drive control unit configured to displace the shake compensation lens (image blur correction lens) based on a calculation processing result.

A variety of optical devices include a shake compensation control apparatus that is configured to detect rotational shake using a rotational velocity meter and move a portion of an imaging lens or imaging element to thereby reduce image shake. However, when imaging at a close range (imaging conditions associated with a high imaging magnification), it is not possible to ignore image deterioration caused by vibration that cannot be detected only using a rotational velocity meter, that is to say, shaking that is applied in a horizontal or vertical direction in a plane that is orthogonal to the optical axis of the camera, in other words, so-called translational shake. For example, macro-imaging by approaching to about 20 cm of the object to be imaged requires active detection and compensation of translational shake. It is also necessary to detect and compensate translational shake during imaging under conditions when the focal distance of the imaging optical system is extremely large (for example, 400 mm) even when the object to be imaged is positioned at a distance of approximately one meter from the camera.

The technique disclosed in Japanese Patent Application Laid-Open No. 7-225405 is configured to calculate translational shake by application of double integration to the acceleration detected by an acceleration meter and thereby drive a shake compensation unit by including the output of a separately provided rotational velocity meter.

However, the output of the acceleration meter used in the detection of translational shake exhibits a tendency to be affected by environmental fluctuation such as disturbances, noise or temperature change. Consequently high accuracy compensation of translational shake is difficult since the effect of these unstable factors is further increased by double integration of the detected acceleration. Japanese Patent Application Laid-Open No. 2010-25962 discloses calculation of translational shake by treating translational shake as rotational shake when there is a center of rotation at a position separated from the camera. This method executes shake compensation by providing a rotational velocity and an acceleration meter and using the output of those meters to calculate a compensation value and an angle using a rotation radius of the rotational shake. Unstable factors resulting from an acceleration meter as described above can be mitigated by calculation of a rotation center and limiting to frequency bands in which the effect of disturbances is low.

Compensation of translational shake by shake compensation is associated with the following conditions as a result of the large difference in the shake amount to be compensated on the image surface due to the difference resulting from whether the object to be imaged is imaged at a close range or imaged at a long range (that is to say, the difference in the imaging magnification).

An electronic view finder (EVF) image that is continuously imaged by causing a display apparatus attached to an image capturing apparatus to function as an EVF includes the function of using an image processing technique to execute continuous focusing with an auto-focus (AF) process. This processing is termed a continuous AF function. In this case, a translational shake compensation amount is calculated from the imaging magnification of the imaging lens to thereby compensate image shake. Even when the amount of translational shake of the camera is the same, the compensation amount for translational shake to be compensated on the image surface varies in response to the imaging magnification since the imaging magnification constantly changes during AF operations. If shake compensation is performed without modification in accordance with information for imaging magnification obtained from a zoom or focus state, there is a risk of an effect on shake compensation effect of the shake compensation if an excessive large compensation amount is used in relation to translational shake. Furthermore, shake compensation control performance may be adversely affected when the shake compensation lens (image blur correction lens) immediately reaches a control limit (end position in a moveable range) as a result of excessive control.

The present invention has the object of reducing deterioration in shake compensation control performance caused by rapid variation in an imaging magnification produced during AF operations, and executing high accuracy image shake compensation in relation to translational shake.

SUMMARY OF THE INVENTION

An apparatus according to the present invention that is configured to solve the above circumstances includes a shake compensation unit, a detection unit configured to detect a shake amount of an apparatus including translational shake produced along a direction of travel of the apparatus in a direction orthogonal to the optical axial of the imaging optical system, a compensation amount calculation unit configured to calculate a compensation coefficient (correction coefficient) by acquiring a detection signal from the detection unit, information for a zoom lens position and a focus lens position in the imaging optical system, and information showing the degree of focus of the imaging optical system, and calculate a compensation amount for the shake compensation unit, and a drive unit configured to drive the shake compensation unit in accordance with the compensation amount. The compensation amount calculation unit reduces the compensation coefficient (correction coefficient) for a low degree of focus in comparison to the compensation coefficient (correction coefficient) for a high degree of focus.

According to the present invention, deterioration in shake compensation control performance caused by rapid variation in an imaging magnification produced during AF operations can be reduced while executing high accuracy image shake compensation in relation to translational shake.

Further features of the present invention will become apparent from the following description of exemplary embodiments (with reference to the attached drawings).

BRIEF DESCRIPTION OF THE DRAWINGS

FIG. 12A and FIG. 12B are block diagrams describing a calculation process of an imaging magnification for shake compensation control in order to describe a third exemplary embodiment of the present invention.

FIG. 13A to FIG. 13D describe an example of temporal variation in rotational velocity, the absolute value of rotational velocity, a fluctuation amount, and AF reliability information.

DESCRIPTION OF THE EMBODIMENTS

The preferred embodiments for execution of the present invention will be described below with reference to the figures. In addition to a digital single lens reflex camera, or a digital compact camera, a shake compensation control apparatus according to the present invention can be mounted on various types of image capturing apparatuses or optical devices such as digital video cameras, surveillance cameras, Web cameras, and mobile telephones.

First Exemplary Embodiment

Figure 1:
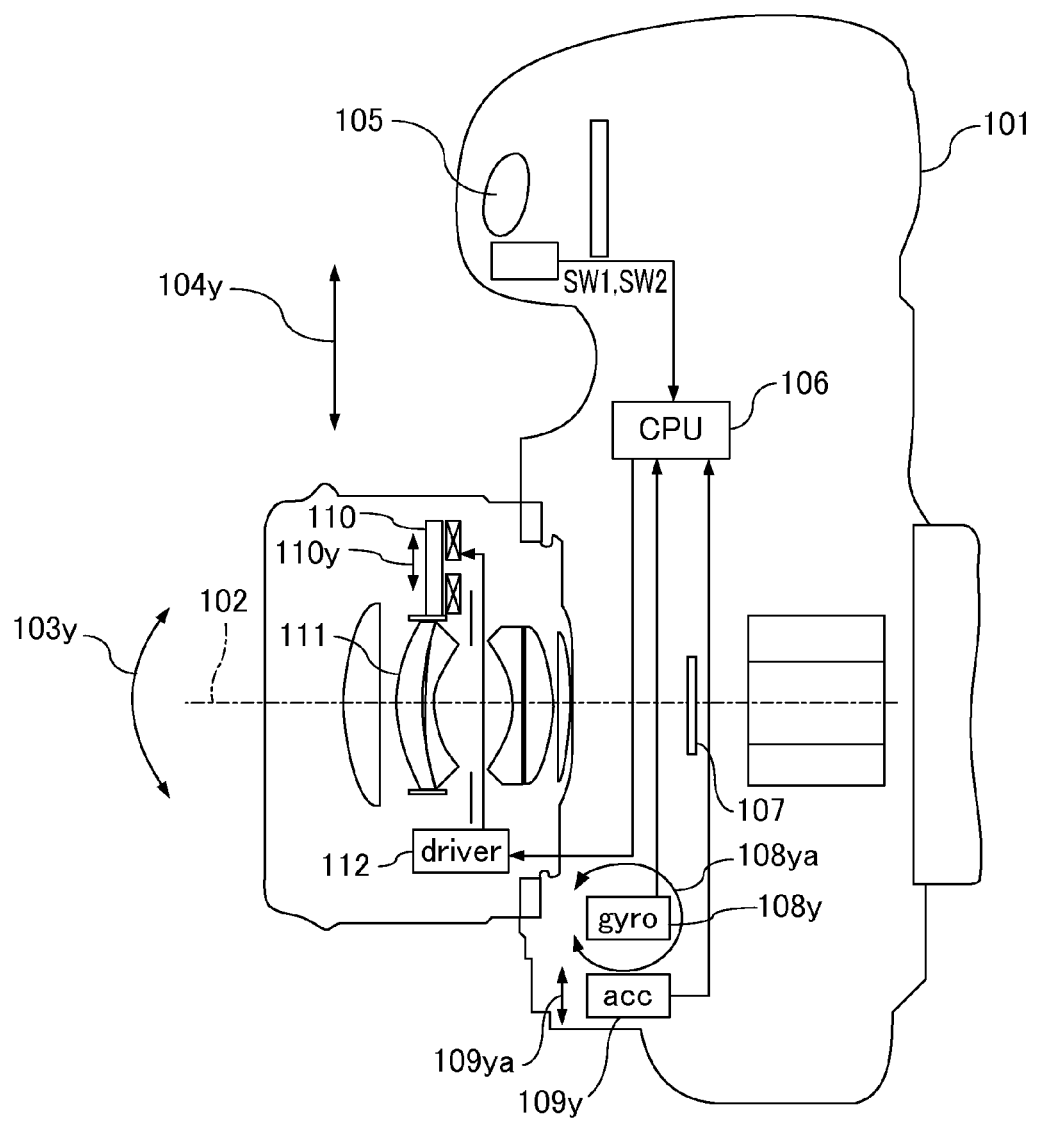
FIG. 1 schematically illustrates a camera mounting a shake compensation system as viewed from above in order to describe a first exemplary embodiment of the present invention in conjunction with FIG. 2 to FIG. 9.
Figure 2:
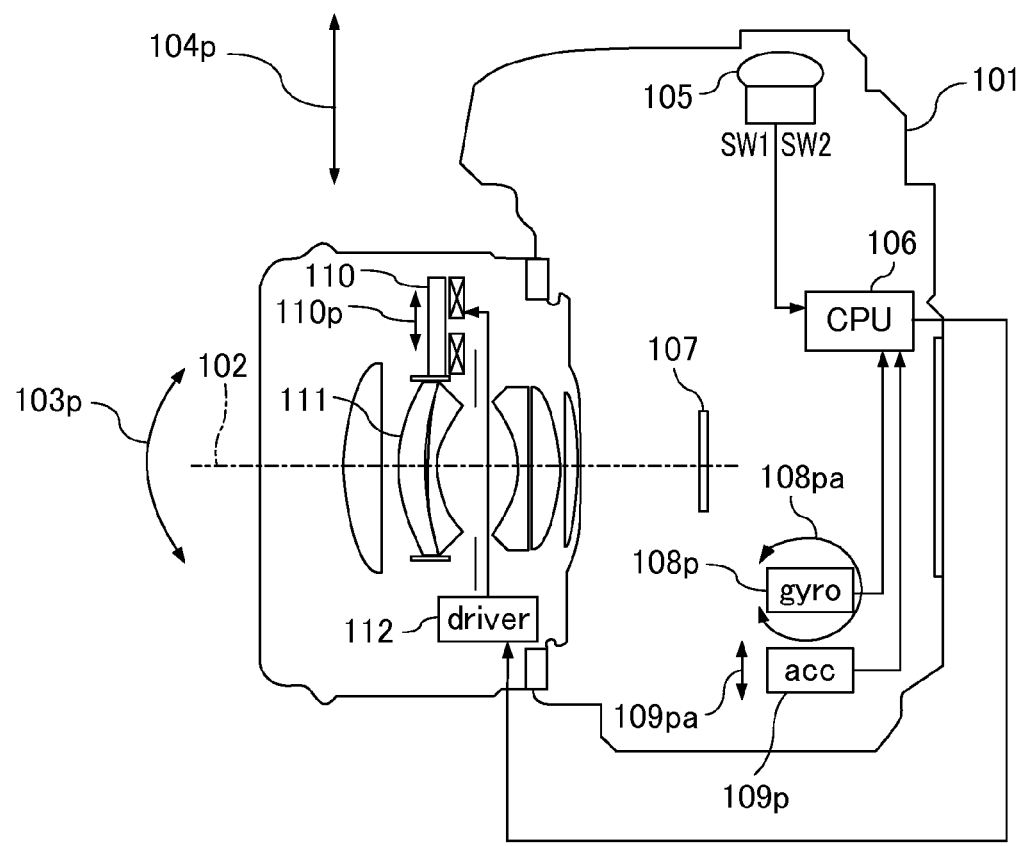
FIG. 2 schematically illustrates the camera in FIG. 1 viewed from the side.

FIG. 1 and FIG. 2 illustrates a configuration example of a camera as an example of an optical apparatus provided with a shake compensation control apparatus according to the first exemplary embodiment. FIG. 1 is a schematic figure of the camera seen in a plane view. FIG. 2 is a schematic view of the camera seen from the side. The axis denoted by the dotted line in the figure illustrates an optical axis 102 of the imaging optical system of a camera 101. The shake compensation system mounted in this camera executes image shake compensation with reference to the optical axis 102 in relation to shake shown by the arrow 103$p$, 103$y$ (hereinafter referred to as "rotational shake") and shake shown by the arrow 104$p$, 104$y$ (hereinafter referred to as "translational shake"). That is to say, rotational shake is the shake that is produced in response to rotation of the apparatus about an axis orthogonal to the optical axis of the imaging optical system. Translational shake is the shake produced along the direction of travel of the apparatus along a direction orthogonal to the optical axis of the imaging optical system. Those reference numerals to which the letter "p" has been added denote a pitch direction, and the letter "y" denotes a yaw direction. The pitch and yaw directions are mutually orthogonal, and furthermore, both directions are orthogonal to the direction of the optical axis 102.

A release button 105 is provided on the main body of the camera 101 and an opening and closing signal of a switch is sent to a camera central control unit (CPU) 106 in response to the operation of the button. This example describes a two stage switch that includes a first switch (hereinafter referred to as "SW1") that is placed in an ON position by a half-stroke depression of the release button 105 and a second switch (hereinafter referred to as "SW2") that is placed in an ON position by a full depression of the release button 105. The camera CPU 106 controls the camera operation, and controls image shake compensation. The imaging element 107 converts the optical image of the object to be imaged acquired through the lens of the imaging optical system to an electrical signal and outputs to a signal processing unit (not illustrated).

The shake detection unit that detects camera shake is configured by a rotational velocity detection unit and an acceleration detection unit.

The rotational velocity meter 108$p$, 108$y$ detects the respective rotational shake shown by the arrows 108$pa$, 108$ya$. The acceleration meter 109$p$, 109$y$ detects the respective translational shake shown by the arrows 109$pa$, 109$ya$. The respective detection signals of the rotational velocity meter 108$p$, 108$y$ and the acceleration meter 109$p$, 109$y$ are input into the camera CPU 106.

The shake compensation unit 110 drives the shake compensation lens (image blur correction lens) 111 in a direction that is orthogonal to the optical axis 102, and more specifically, in a direction of the arrow 110$y$ in FIG. 1 and the arrow 110$p$ in FIG. 2 to thereby compensate shake by addition of both the rotational shake and the translational shake. The drive unit 112 controls the shake compensation unit 110 in accordance with a control command from the camera CPU 106 to thereby execute a shake compensation operation. The present exemplary embodiment adopts a configuration in which the shake compensation lens (image blur correction lens) 111 is displaced in a plane that is vertically oriented with reference to the optical axis based on a compensation amount calculated by the camera CPU 106. The method of compensation based on the compensation amount may be applied in another configuration. For example, such a configuration may include a method of displacing the imaging element 107 in a plane that is vertically oriented with respect to the optical axis, or a method of varying the segmenting position for an image in each imaging frame output by the imaging element 107. Furthermore, a compensation method may be used in which such features are suitably combined.

Figure 3:
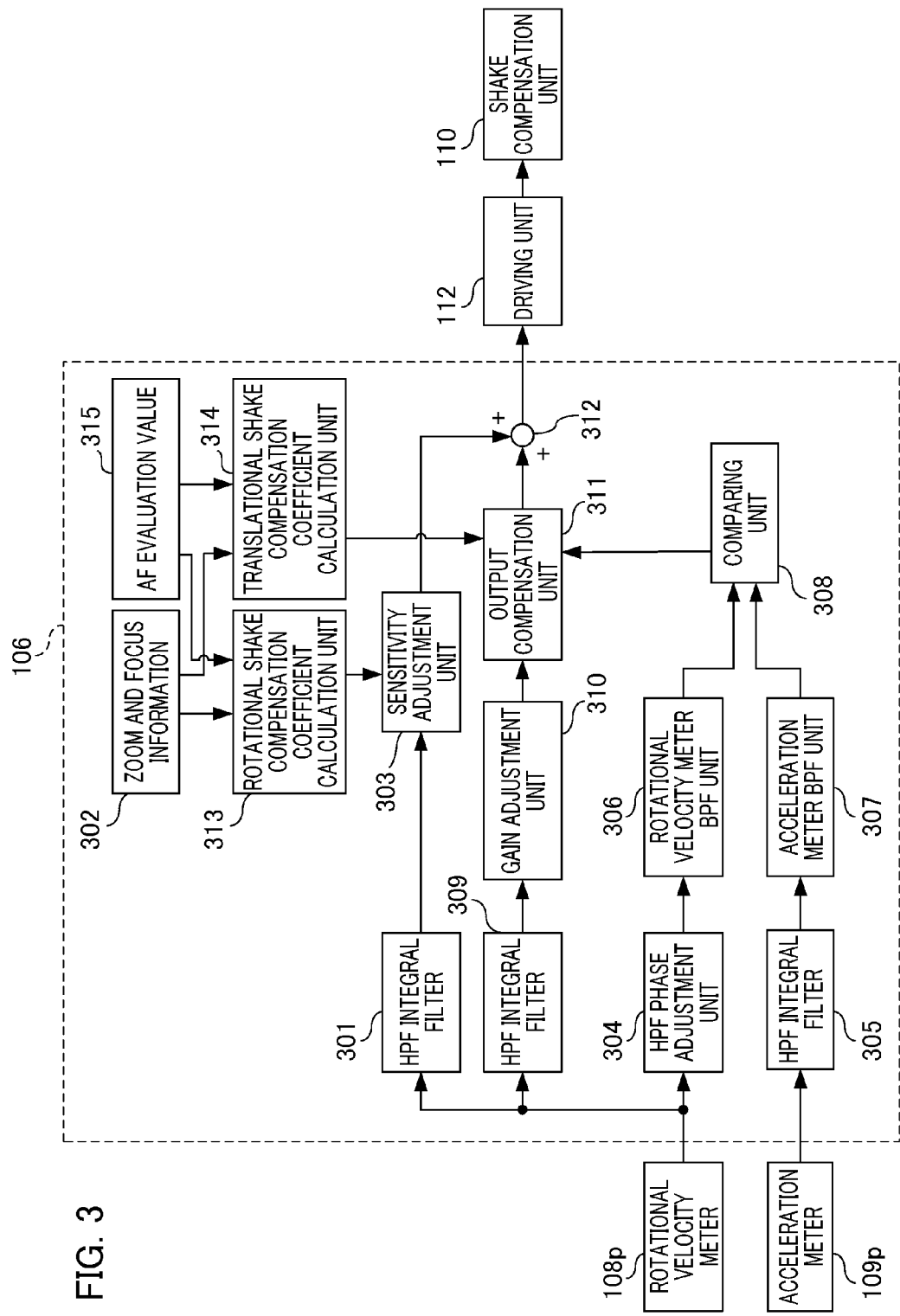
FIG. 3 is a block diagram illustrating a configuration example of a shake compensation control apparatus.

FIG. 3 is a block diagram illustrating a configuration example of a shake compensation control apparatus according to the present exemplary embodiment. FIG. 3 only illustrates a configuration adapted for shake produced in a perpendicular direction of the camera (the pitch direction: direction of the arrows 103p, 104p in FIG. 2). However, the same configuration may also be provided in relation to shake produced in a horizontal direction of the camera (yaw direction: the direction of the arrows 103y, 104y in FIG. 1). Since these configurations are basically the same configuration, the description below will only refer to the configuration adapted for the pitch direction. FIG. 3 is a block diagram illustrating the function of processing executed by the camera CPU 106. However, each processing step is executed by interpretation and execution of a program stored in a memory (not illustrated) by the camera CPU 106.

Compensation of rotational shake will be described making reference to FIG. 3. Rotational shake is detected by the first detection unit and shake compensation is performed under the control of the camera CPU 106.

The rotational velocity detection signal of the rotational velocity meter 108p is input into an HPF integral filter 301 of the camera CPU 106. A signal in which direct current (DC) components are cut by a high pass filter (HPF) is integrated in the HPF integral filter 301 and converted to a rotational signal. The frequency band for camera shake is approximately 1 to 10 Hz, and the HPF of the HPF integral filter 301 includes first order HPF characteristics that block frequency components (for example, less than or equal to 0.1 Hz) that are sufficiently discrete from the shaking frequency band.

The output of the HPF integral filter 301 is input to a sensitivity adjustment unit 303. At that time, the sensitivity adjustment unit 303 also receives input of information from a rotational shake compensation coefficient calculation unit (first compensation coefficient (correction coefficient) calculation unit) 313. The rotational shake compensation coefficient calculation unit 313 acquires zoom and focus information 302. The information is lens position information acquired by the detection unit provided in the drive unit of the imaging optical system. A first compensation coefficient (correction coefficient) (hereinafter referred to as "rotational shake compensation coefficient") is calculated based on the focal distance or the imaging magnification determined by the information, and output to the sensitivity adjustment unit 303. The method of calculating the rotational shake compensation coefficient will be described in detail below. When the output of the rotational shake compensation coefficient calculation unit 313 is input into the sensitivity adjustment unit 303, the adjustment unit amplifies the output of the HPF integral filter 301 for use as a target value for rotational shake compensation. In this manner, a variation in the shake compensation sensitivity in a camera image is compensated in relation to a shake compensation stroke of the shake compensation unit 110 resulting from a variation in optical information such as the focus or zoom of the lens. The compensation target value for rotational shake calculated by the sensitivity adjustment unit 303 is sent to an adding device 312. The output of the adding device 312 is sent to the drive unit 112 as an image shake compensation amount to thereby drive the shake compensation unit 110. In this manner, image shake compensation is executed.

Next, translational shake compensation will be described. Translational shake produced in an apparatus in a direction that is horizontal or vertical to a plane that is orthogonally oriented to the optical axis of an imaging optical system is detected by a second detection unit, and shake compensation is performed under the control of the camera CPU 106.

The output of the rotational velocity meter 108p is input to an HFP integral filter 309, and after the DC components are cut by the HPF in the HFP integral filter 309, is integrated and converted to a rotational signal. The output of the HFP integral filter 309 is input to again adjustment unit 310. The gain adjustment unit 310 and the HFP integral filter 309 adjust the gain and the phase characteristics in the frequency band for translational shake compensation. The output of the gain adjustment unit 310 is compensated by an output compensation unit 311 described below to thereby configure a compensation target value for translational shake that is sent to the adding device 312 and added to the rotational shake compensation target value described above. The addition result of the compensation amount for translational shake and the compensation amount for rotational shake is taken as the image shake compensation amount.

In translational with the above processing, the output of the rotational velocity meter 108p is input to a HPF phase adjust unit 304, and DC components that are overlaid on the output of the rotational velocity meter 108p are cut by the HPF phase adjustment unit 304 to thereby execute phase adjustment on the signal. The cut-off frequency used herein is adjusted with reference to the cut-off frequency of the HPF of the HPF integral filter 305 described below, and is adjusted to coincide with the frequency characteristics. The output of the HPF phase adjustment unit 304 is sent to a rotational velocity meter band pass filter (BPF) unit 306 for extraction of frequency components in a predetermined band.

The output of the acceleration meter 109p is input to the HPF integral filter 305, and after the DC components are cut by the HPF in the HFP integral filter 305, is converted to an integrated velocity signal. As described above, the cut-off frequency of the HPF at that time is adjusted with reference to the cut-off frequency of the HPF. The output of the HPF phase adjustment unit 305 is sent to an acceleration meter BPF unit 307 for extraction of frequency components in a predetermined band.

The respective outputs of the rotational velocity meter BPF unit 306 and the acceleration meter BPF unit 307 are input to the comparison unit 308. The comparison unit 308 calculates a compensation amount (compensation coefficient (correction coefficient)) for compensation of the output of the gain adjustment unit 310, and outputs to the output compensation unit 311. The method of calculation of the compensation amount in the comparison unit 308 will be described below.

The output of the translational shake compensation coefficient calculation unit (second compensation coefficient (correction coefficient) calculation unit) 314 is also input into the output compensation unit 311. Information for the zoom and focus information 302 and AF evaluation value 315 is input to the translational shake compensation coefficient calculation unit 314. The AF evaluation value 315 is information indicating the degree of focus of the imaging optical system relative to the object to be imaged. In the present example, information is used that indicates the degree of contrast obtained by extraction of high frequency components from the imaging signal by the imaging element, and is output from the AF signal processing unit (not illustrated) to the rotational shake compensation coefficient calculation unit 313 and the translational shake compensation coefficient calculation unit 314. The translational shake compensation coefficient calculation unit 314 calculates and outputs a translational shake compensation coefficient based on the imaging magnification calculated using this information. The output of the translational shake compensation coefficient calculation unit 314 is input to the output compensation unit 311, and the output of the gain adjustment unit 310 is compensated based on the calculated translational shake compensation coefficient to thereby obtain a translational shake compensation target value. The adding device 312 adds the translational shake compensation target value to the rotational shake compensation target value described above, and outputs to the drive unit 112. The drive unit 112 drives the shake compensation unit 110 and compensates the imaging shake resulting from rotational shake and translational shake.

Next, the method of calculation of the image shake compensation amount based on the compensation coefficient (correction coefficient) output from the rotational shake compensation coefficient calculation unit 313 and the translational shake compensation coefficient calculation unit 314, and the compensation amount output from the comparison unit 308 will be described.

Figure 4:
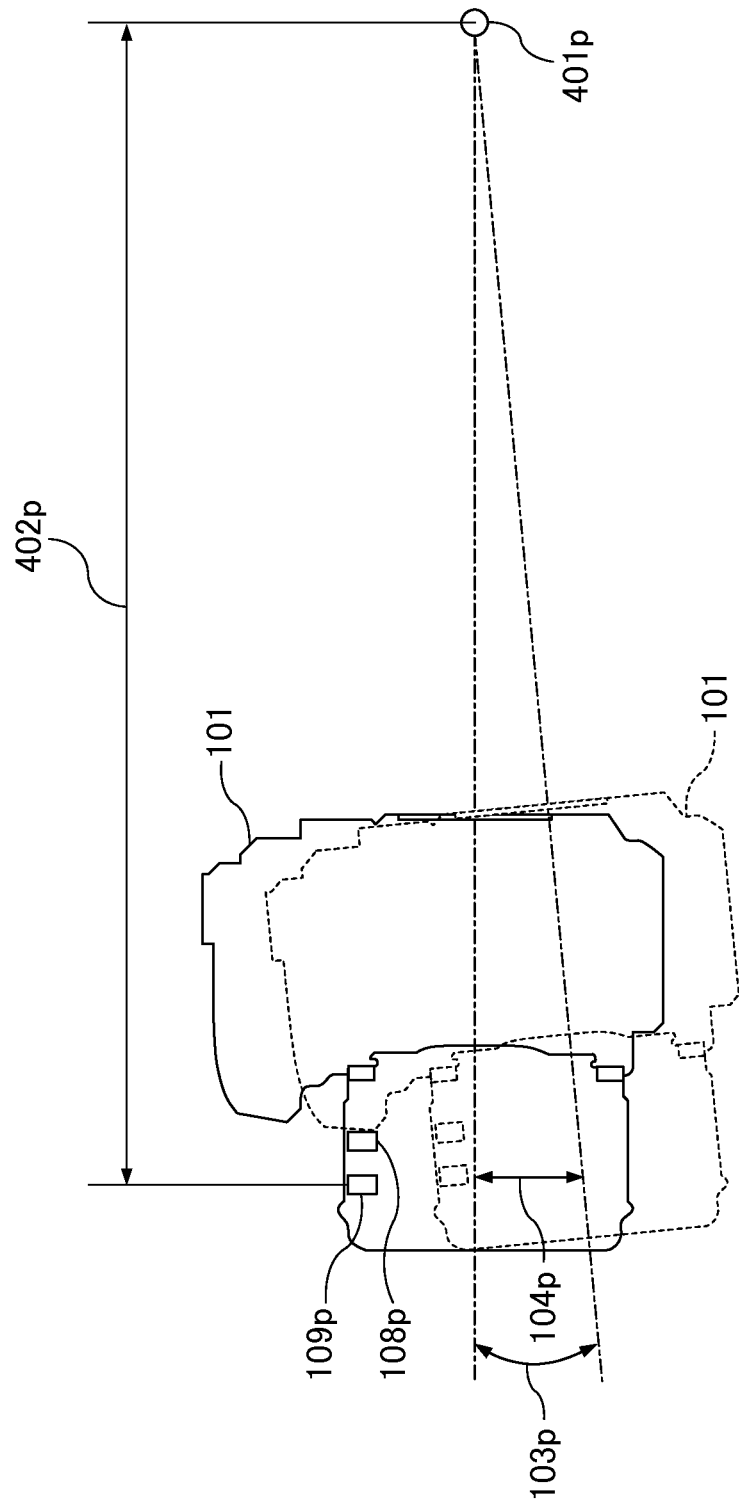
FIG. 4 describes a rotation center and rotation radius of rotational shake.

FIG. 4 describes the rotational shake 103p and the translational shake 104p of the camera 101. The dimension of the translational shake 104p at the principal point in the imaging lens in the imaging optical system is denoted as Y, and the dimension of the rotational shake, that is to say, the rotational phase is denoted as θ. The length of the rotation radius 402p for a determined rotation center 401p of rotational shake is denoted as L and corresponds to the distance from the rotation center 401p to the acceleration meter 109p. Furthermore, the rotational velocity is denoted as ω, the velocity as V, the acceleration as A and the rotational acceleration as ωa. On the basis, the following equations are established.

[Equation 1]

$$Y = L \times \theta \quad (1)$$

$$V = L \times \omega \quad (2)$$

$$A = L \times \omega a \quad (3)$$

Herein, since Y in Equation (1) is calculated as the displacement when the output of the acceleration meter 109p is double-integrated and θ is calculated as the angle when the output of the rotational velocity meter 108p is single integrated, the length L of the rotation radius is calculated by dividing Y by θ. Since V is calculated as the velocity when the output of the acceleration meter 109p is integrated and ω is calculated from the output of the rotational velocity meter 108p, the length L of the rotation radius is calculated by dividing V by ω. Since A in Equation (3) is calculated from the output of the acceleration meter 109p and ωa is calculated by differentiating the output of the rotational velocity meter 108p, the length L of the rotation radius is calculated by dividing A by ωa. The value for L can be calculated by either method.

The shake amount δ produced by the image surface is calculated in Equation (4) below from the translational shake Y at the principal point position of the imaging optical system, the shake angle θ of the imaging optical system, the focal distance f and the imaging magnification β.

[Equation 2]

$$\delta = (1+\beta) \times f \times \theta + \beta \times Y \quad (4)$$

The values for f and β in the first term on the right side of Equation (4) are calculated from the positional information for the zoom lens and the focus lens of the imaging optical system and the imaging magnification and the focal distance obtained from that information. The shake angle θ is calculated from the first order integration of the output of the rotational velocity meter 108p. Therefore, rotational shake compensation can be executed as described with reference to FIG. 3 using this information.

The β value for the second term on the right side of Equation (4) above is calculated from the positional information for the zoom lens and the focus lens and the imaging magnification obtained from that information. The value Y is calculated by double integration of the output of the acceleration meter 109p. Translational shake compensation is executed as described with reference to FIG. 3 using this information.

Image shake compensation according to the present exemplary embodiment is executed on the shake amount δ by rewriting equation (4) above as shown in Equation (5) below.

[Equation 3]

$$\delta = (1+\beta) \times f \times \theta + \beta \times L \times \theta \quad (5)$$

That is to say, translational shake Y makes no use of the displacement of translational shake calculated by integration of the output of the acceleration meter 109p. The length L of the rotation radius is calculated from Equation (1), Equation (2), or Equation (3), and then the value for L, the integration result of the output of the rotational velocity meter 108p (θ), and the imaging magnification β are used to calculate the shake amount δ. The rotational shake compensation coefficient calculation unit 313 calculates the compensation coefficient (correction coefficient) "(1+β)×f" in the first term on the right side of Equation (5), and the translational shake compensation coefficient calculation unit 314 calculates the compensation coefficient (correction coefficient) "β" in the second term on the right side of Equation (5).

Figure 5:
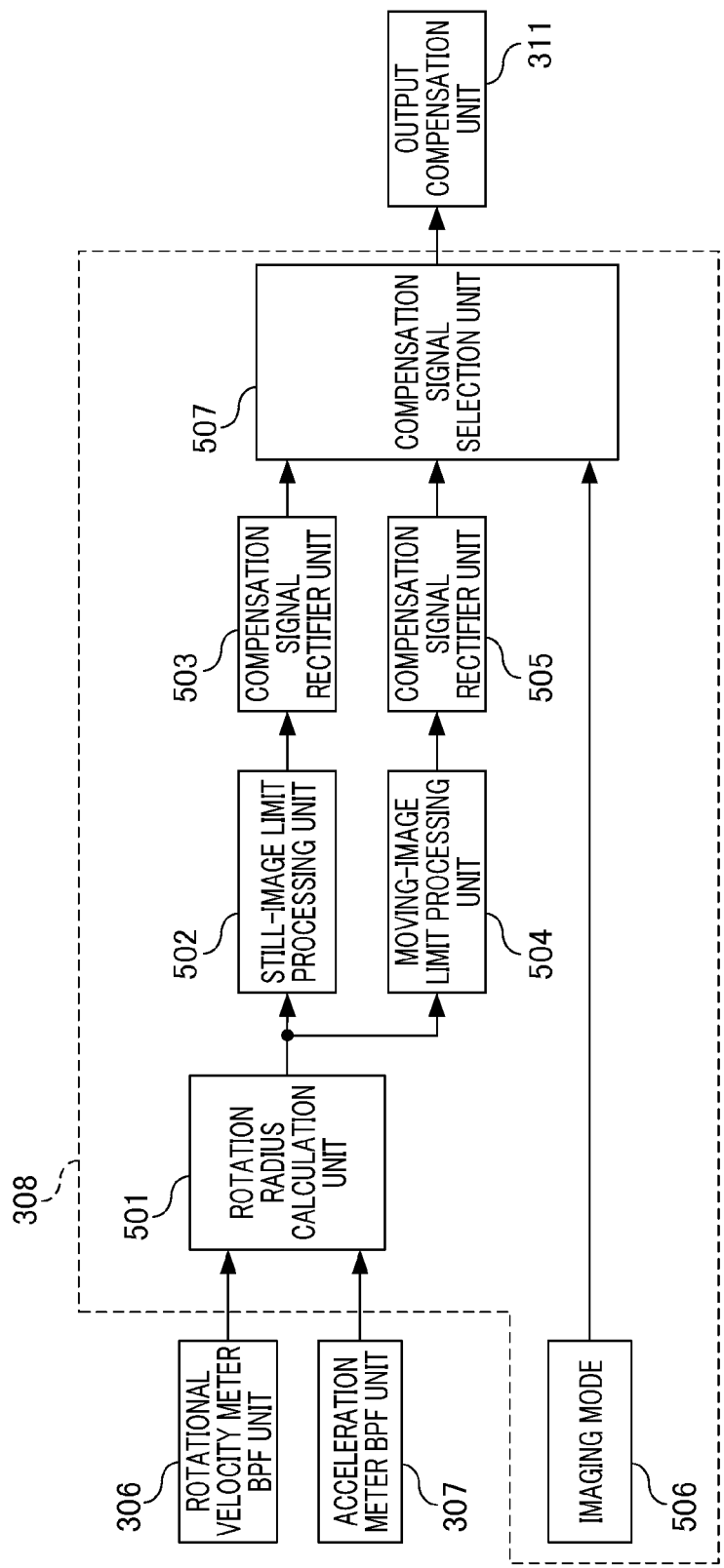
FIG. 5 is a block diagram illustrating a configuration example of a comparison unit 308 in FIG. 3.

FIG. 5 is a block diagram illustrating an example of the internal configuration of compensation amount calculation processing in the comparison unit 308 in FIG. 3.

The respective outputs of the rotational velocity meter BPF unit 306 and the acceleration meter BPF unit 307 are sent to the rotation radius calculation unit 501, and the rotation radius calculation unit 501 calculates the length L of the rotation radius using Equation (6).

[Equation 4]

$$L = V/\omega \quad (6)$$

The value for L is calculated using Equation (2) in the present example.

The rotation radius L may be calculated from the ratio of the velocity V in a predetermined time and the peak values for the respective maximum amplitudes of the rotational velocity ω (for example, when the cut-off frequency for the rotational velocity meter BPF unit 306 and the acceleration meter BPF unit 307 is 5 Hz, it is set to approximately 200 ms). Subsequent updating of the rotation radius L is performed for each point of time at which the velocity V and the rotational velocity ω are respectively calculated. The velocity V and the rotational velocity ω are averaged time-sequentially and the high frequency components are cut using a low pass filter (LPF) to thereby enable calculation of the rotation radius by eliminating high frequency noise components when calculating the rotation radius.

The rotation radius calculation unit 501 sends the calculated L value to the still image limit processing unit 502 and the moving image limit processing unit 504. The still image limit processing unit 502 executes a calculation process using the upper limiting value that is set for imaging of still images. When the L value that is output by the rotation radius calculation unit 501 is greater than or equal to the upper limiting value for imaging of still images, the L value is fixed to the upper limiting value. When the L value that is output by the rotation radius calculation unit 501 less than the upper limiting value for imaging of still images, the L value that is output by the rotation radius calculation unit 501 is output without modification.

The moving image limit processing unit 504 executes a calculation process using the upper limiting value that is set for imaging of moving images. When the L value that is output by the rotation radius calculation unit 501 is greater than or equal to the upper limiting value for imaging of moving images, the L value is fixed to the upper limiting value. When the L value that is output by the rotation radius calculation unit 501 less than the upper limiting value for imaging of moving images, the L value that is output by the rotation radius calculation unit 501 is output without modification. The output value of the still image limit processing unit 502 and the moving image limit processing unit 504 are respectively sent to the compensation signal rectifier unit 503 and the compensation signal rectifier unit 505. The compensation signal rectifier unit 503 and the compensation signal rectifier unit 505 respectively execute rectification processing in relation to the output value of the still image limit processing unit 502 and the moving image limit processing unit 504 so that a stepwise variation does not occur in the compensation signal. Rectification of the signal is performed by cutting the high frequency components using an LPF (low pass filter). The cut off frequency of the LPF is set to a frequency for example of less than or equal to 0.5 Hz. Another means may be configured to perform signal rectification by a moving average process applied in a predetermined period.

The respective output of the compensation signal rectifier unit 503 and the compensation signal rectifier unit 505 are sent to the compensation signal selection unit 507. Information for the imaging mode 506 is input to the compensation signal selection unit 507, selection of the compensation signal is executed in accordance with the flowchart shown in FIG. 6 and FIG. 7 described below and the result is output to the output compensation unit 311. Information relating to the imaging mode 506 is information indicating whether the mode is a still-image imaging mode or a moving-image imaging mode.

Figure 6:
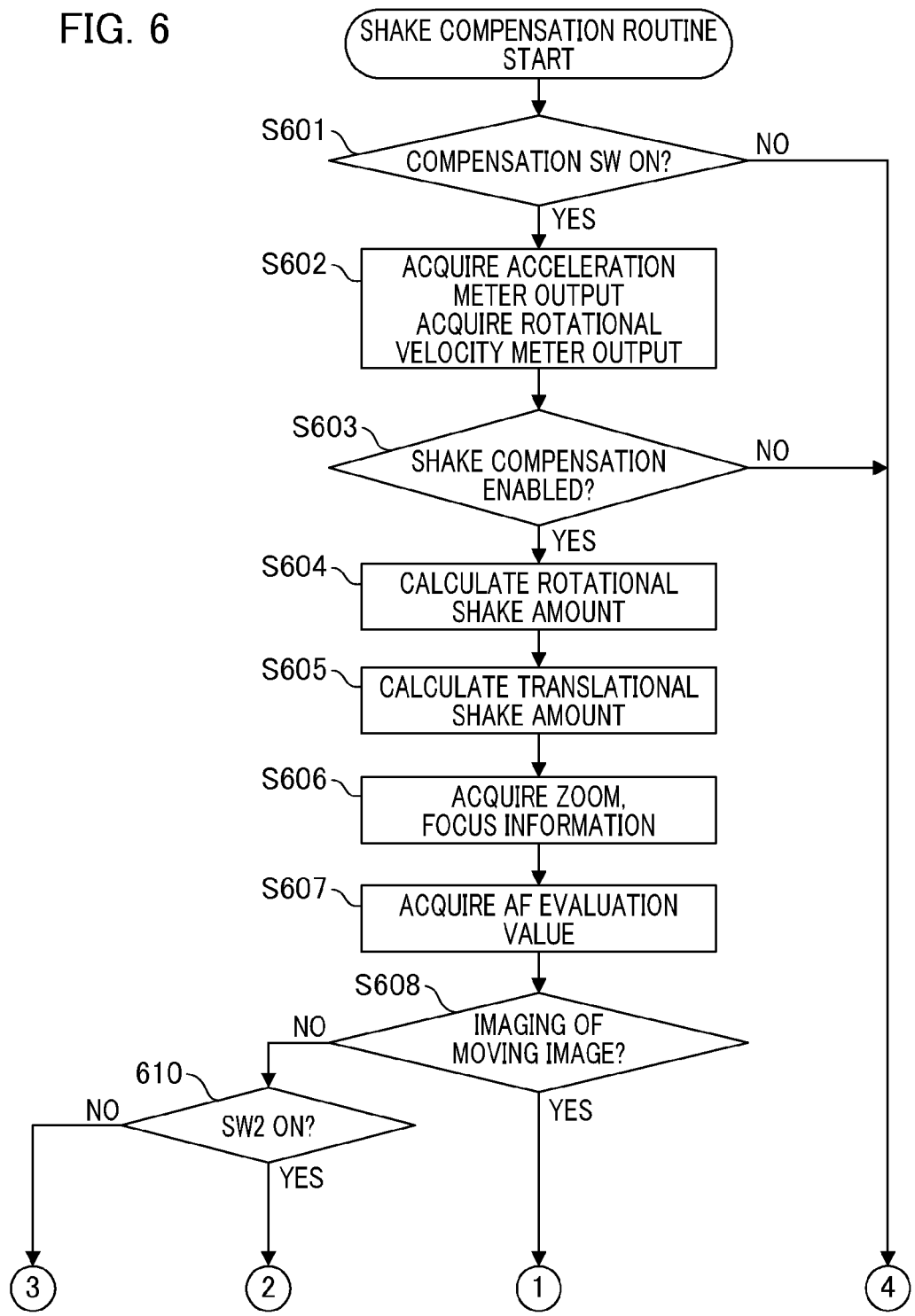
FIG. 6 is a flowchart describing shake compensation control in conjunction with FIG. 7, and illustrating the first half of the processing operations.
Figure 7:
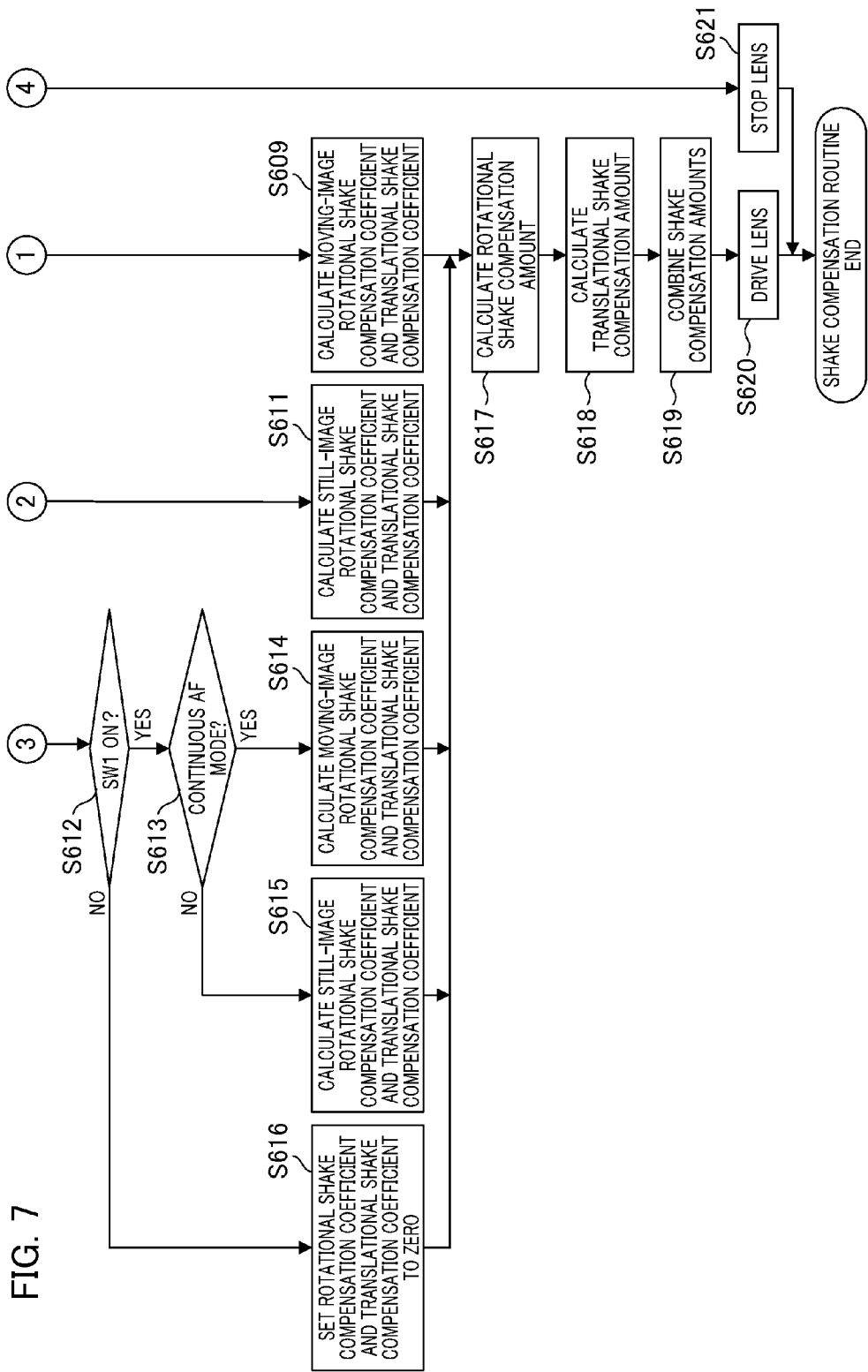
FIG. 7 is a flowchart illustrating the second half of the processing operations following on from FIG. 6.

Next, the overall operation for shake compensation in the present exemplary embodiment will be described making reference to the flowchart in FIG. 6 and FIG. 7. The present processing is commenced when the principal power source of the apparatus is placed in the ON position, and is executed on a predetermining sampling cycle (interval).

Firstly in S601 in FIG. 6, the CPU 106 detects the state of the shake compensation switch (hereinafter denoted as "shake compensation SW"). The shake compensation SW is provided in an operation unit (not illustrated), and is an operation designation unit used when a photographer issues a command for the camera to perform (shake compensation SW is in the ON position) or not perform shake compensation (shake compensation SW is in the OFF position). When the shake compensation SW is in the ON position, the processing proceeds to S602, and when in the OFF position, the processing proceeds to S621 in FIG. 7.

In S602, incorporation of the output of the acceleration meter 109$p$ and the output of the rotational velocity meter 108$p$ is executed. Next, the camera CPU 106 in S603 determines whether or not shake compensation is enabled. For example, it is determined that shake compensation is not enabled in a state from when the power source is placed in the ON position until shake compensation of the output of the acceleration meter 109$p$ and the output of the rotational velocity meter 108$p$. Meanwhile, it is determined that shake compensation is enabled after shake compensation of the output of the acceleration meter 109$p$ and the output of the rotational velocity meter 108$p$. The determination processing in S603 is provided since shake compensation performance is insufficient when the detection value immediately after power supply is unstable, and in this state, shake compensation is not executed. The elapsed time from power input and the variation amount of the detection signal enables determination of whether or not the acceleration detection signal or the rotational velocity detection signal has stabilized. The processing proceeds to S604 when the results of the determination indicate the shake compensation is enabled, and proceeds to S621 in FIG. 7 when in a state in which shake compensation is not enabled.

The camera CPU 106 in S604 calculates the rotational shake amount using the method described with reference to FIG. 3, and calculates an average shake amount in S605. After acquisition of zoom and focus information 302 in S606, the AF evaluation value 315 is acquired for calculation of the shake compensation coefficient (correction coefficient) in S607, and the processing proceeds to S608.

In S608, it is determined whether or not a moving-image imaging state is configured. When moving-image imaging state is configured, the processing proceeds to S609 in FIG. 7, and when this is not the case, the processing proceeds to S610. In S609, the rotational shake compensation coefficient and the translational shake compensation coefficient for a moving image are respectively calculated, and the processing proceeds to S617. Each compensation coefficient (correction coefficient) is calculated using the AF evaluation value 315 and the zoom and focus information 302, and the details thereof will be described below. In S610 in FIG. 6, it is determined whether SW2 is in the ON position, that is to say, whether the operation for starting of exposure for a still image has been performed. When the SW2 is in the ON position, the processing proceeds to S611 in FIG. 7, and when SW2 in the OFF position, the processing proceeds to S612 in FIG. 7. In S611, the rotational shake compensation coefficient and the translational shake compensation coefficient for imaging of a still image are respectively calculated, and the processing proceeds to S617. Each compensation coefficient (correction coefficient) is calculated from the zoom and focus information 302 after completion of the AF operation after SW2 is placed in the ON position.

In S612, it is determined whether or not SW1 is in the ON position. When it is determined that SW1 is in the ON position, the processing proceeds to S613, and when SW1 is in the OFF position, the processing proceeds to S616. In S613, it is determined whether or not the current AF mode is continuous AF mode. When in continuous AF mode, the processing proceeds to S614. When processing is in another mode, for example, manual focus mode in which focus adjustment is executed manually, the processing proceeds to S615. In S614, the rotational shake compensation coefficient and the translational shake compensation coefficient for a moving image are respectively calculated. Each compensation coefficient (correction coefficient) is calculated using the AF evaluation value 315 and the zoom and focus information 302 using the same method of calculation as that described in S609. The details thereof will be described below. In S615, the rotational shake compensation coefficient and the translational shake compensation coefficient for imaging of a still image are respectively calculated based on the zoom and focus information 302. When the AF mode is not continuous AF mode, the rotational shake compensation coefficient and the translational shake compensation coefficient are calculated using the zoom and focus information 302 after completion of the AF operation when SW1 is in the ON position. In S616, the rotational shake compensation coefficient is calculated from the zoom and focus information 302, and the translational shake compensation coefficient is set to zero.

After the processing in the steps S609, S611, S614, S615, S616, the processing proceeds to S617, and camera CPU 106 calculates the rotational shake compensation amount from the rotational shake compensation coefficient calculated to that point using the calculation formula in the first term on the right side of Formula (5). The rotational shake compensation amount when the imaging magnification β is set to an imaging magnification β for imaging of moving images is denoted as "rotational shake compensation amount 1". The rotational shake compensation amount when the imaging magnification β is set to an imaging magnification β2 for imaging of still images is denoted as "rotational shake compensation amount 2". In this case, the respective compensation amounts are calculated using the following formula.

[Formula 5]

$$\text{rotational shake compensation amount } 1 = (1+\beta c1) \times f \times \theta \quad (7)$$

$$\text{rotational shake compensation amount } 2 = (1+\beta 2) \times f \times \theta \quad (8)$$

The method of calculating of the imaging magnification βc1 used for shake compensation will be described below.

Next, in S618, the translational shake compensation amount is calculated by the translational shake compensation coefficient calculated to that point using the calculation formula in the second term on the right side of Formula (5). The translational shake compensation amount when the imaging magnification β is set to an imaging magnification βc1 for imaging of moving images is denoted as "translational shake compensation amount 1". The translational shake compensation amount when the imaging magnification β is set to an imaging magnification β2 for imaging of still images is denoted as "translational shake compensation amount 2". In this case, the respective compensation amounts are calculated using the following formula.

[Formula 6]

$$\text{translational shake compensation amount } 1 = \beta c1 \times L1 \times \theta \quad (9)$$

$$\text{translational shake compensation amount } 2 = \beta 2 \times L2 \times \theta \quad (10)$$

L1 and L2 respective denote the rotation radius under respective imaging conditions.

Combination of the shake compensation amounts is executed in S619 and the rotational shake compensation amount and the translational shake compensation amount are added. The shake compensation unit 110 is driven in S620 based on the shake compensation amount. On the other hand, when the processing proceeds from S601 or S604 in FIG. 6 to S621 in FIG. 7, control is executed to stop driving of the shake compensation unit 110. When the processing of S620 and S621 is completed, the sub-routine for shake compensation is completed, and the routine is configured in a standby state until the next sampling period, and the processing is then recommenced.

Next, a calculation method for the rotational shake compensation coefficient and the translational shake compensation coefficient will be described.

The rotational shake compensation coefficient calculation unit 313 uses the focal distance f and the imaging magnification β in accordance with the first term on the right side of Equation (5) to calculate the compensation coefficient (correction coefficient) "$(1+\beta) \times f$" for rotational shake. Then the translational shake compensation coefficient calculation unit 314 uses the rotation radius L and the imaging magnification β in accordance with the second term on the right side of Equation (5) to calculate the compensation coefficient (correction coefficient) "$\beta \times L$". A rotational shake compensation amount and a translational shake compensation amount are calculated from these compensation coefficients (correction coefficients) and the rotational shake amount. In S611 and S615 in FIG. 6, the rotational shake compensation coefficient and the translational shake compensation coefficient for imaging of a still image are respective calculated using the zoom and focus information 302 after completion of the AF operation after SW2 is placed in the ON position. In S616, the rotational shake compensation coefficient is calculated from the zoom and focus information 302, and the translational shake compensation coefficient is set to zero. In this regard, in S609 and S614, the rotational shake compensation coefficient and the translational shake compensation coefficient for imaging of moving images are calculated as described below.

The translational shake compensation coefficient calculation unit 314 outputs the shake compensation control imaging magnification βc. The rotational shake compensation coefficient calculation unit 313 outputs a value $((1+\beta c) \times f)$ multiplied by the focal distance f obtained using the zoom and focus information 302 after adding the shake compensation control imaging magnification βc. The reason that the shake compensation control imaging magnification βc is calculated based on the imaging magnification β obtained using the zoom and focus information 302 is as follows.

Imaging of a moving image may be associated with imaging execution as a photographer tracks and frames a target object to be imaged or imaging as the object to be imaged changes during the course of the imaging operation. As a result, the imaging magnification constantly undergoes continuous variation. A defect may arise in the step in which the camera searches for a peak value for the AF evaluation value during a contrast AF operation if shake compensation is executed without modification on the basis of information for an imaging magnification obtained from the zoom and focus state. More specifically, there is a risk of the AF operation being delayed or a risk of a reduction in the reliability of the AF accuracy when imaging a low-contrast object to be imaged or during imaging in a dark location. Under these conditions, if the translational shake compensation amount is excessively large when the focal lens is driven in a direction in which the imaging magnification is increased (moved toward close range), there is a risk of an effect on the shake compensation result. In addition, there is a risk that the shake compensation lens (image blur correction lens) will immediately reach the control limit as a result of excessive control and thereby reduce shake compensation control performance. In the present embodiment, the shake compensation control imaging magnification βc is calculated by execution of the following processing in relation to the imaging magnification β.

Figure 8A:
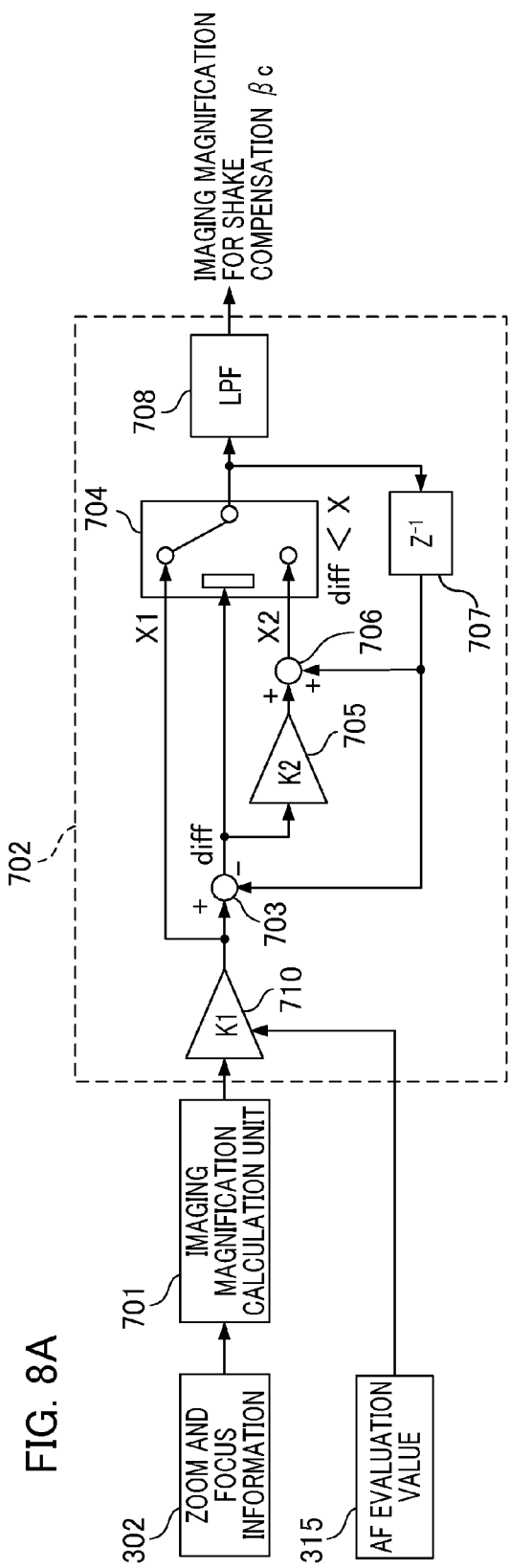
FIG. 8A is a block diagram illustrating a calculation process for an imaging magnification for shake compensation control.

FIG. 8A is a block diagram illustrating an example of the configuration of a calculation unit for calculation of the shake compensation control imaging magnification βc.

The zoom and the focus information 302 is included in the information for the zoom lens position and the focal lens position, and is input to an imaging magnification calculation unit 701. The imaging magnification calculation unit 701 calculates the imaging magnification β and sends the result to a control imaging magnification calculation unit 702. That calculation unit calculates the imaging magnification βc for use in shake compensation control.

Figure 8B:
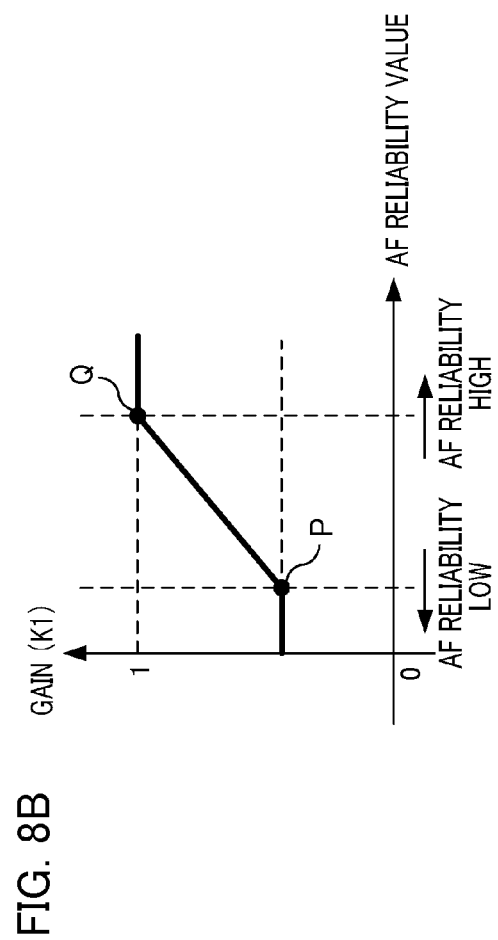
FIG. 8B illustrates the relationship between an AF evaluation value and gain.

The output value of the imaging magnification calculation unit 701 is output to a variable gain unit 710 and multiplied by a variable gain (hereinafter the gain coefficient is denoted as "K1"). FIG. 8B illustrates a graphical representation of a gain table used in the variable gain unit 710.

FIG. 8B is a graph illustrating an example of the relationship between an AF evaluation value on the horizontal axis and the gain coefficient K1 on the vertical axis. At a point P where the AF evaluation value is small and the reliability of AF is low, the K1 value is less than 1. At a point Q where the AF evaluation value is large and the reliability of AF is high, the K1 value is 1. The line PQ has a positive gradient that rises to the right. That is to say, the K1 value is set in response to the AF evaluation value 315, and the K1 value decreases as the AF evaluation value decreases and AF reliability decreases. K1 indicates the minimum value at point P, and indicates a fixed value even when the AF evaluation value has become even smaller. Furthermore, the K1 value increases as the AF evaluation value increases and AF reliability increases, and approaches a value of 1. The K1 value takes a value of 1 at the point Q and continues to take a value of 1 even when the AF evaluation value takes a larger value. Although the present example exemplifies the characteristics shown by the line PQ, the example is not limited thereby, and may be set by characteristics indicated by a curved line or a bent line.

The output value of the variable gain unit 710 is sent to a condition comparing device 704 as a value X1 in addition to being sent as a positive input to the subtracting device 703. The output value of the condition comparing device 704 is supplied through the delaying device 707 as a negative input of the subtracting device 703. The output of the delaying device 707 is sampling data of the previous cycle in relation to the output of the condition comparing device 704. The subtracting device 703 subtracts the sampling data of the previous cycle from the output value of the variable gain unit 710. When the output of the subtracting device 703 is denoted as "diff", that value is input to the condition comparing device 704. The condition comparing device 704 determines whether or not the diff is smaller than the preset predetermined value (denoted as X). When diff is less than a predetermined value X, the condition comparing device 704 selects the imaging magnification X1 that is the output value of the variable gain unit 710 and outputs to the LPF (low pass filter) 708.

A value for diff that is output by the subtracting device 703 is sent to the multiplying device 705 and is multiplied by a preset gain coefficient (denoted as K2). The value K2 is set to a value less than 1 (for example, 0.1), diff has a positive sign, and when the value is large, it is set so that the imaging magnification does not undergo rapid variation. The adding device 706 adds the output of the multiplying device 705 to the sampling data on the previous cycle of the delaying device 707, and the addition result is sent to the condition comparing device 704 as X2. When diff is greater than or equal to X, the condition comparing device 704 selects X2 and outputs to LPF 708.

Since the predetermined value X that is the determination standard is set to a positive value, when diff is a negative value, X1 that is the output value of the imaging magnification calculation unit 701 is always selected by the condition comparing device 704. Therefore, the output value of the condition comparing device 704 undergoes an instant transition in a direction in which the value decreases. However, when diff is a positive value and the variation amount in an increasing direction is large, rapid variation is suppressed.

The LPF 708 cuts the high frequency components upon receipt of the output value of the condition comparing device 704 and outputs the shake compensation control imaging magnification βc to the sensitivity adjusting unit 303 or the output compensation unit 311. The LPF 708 also has the function of suppressing rapid variation in the shake compensation imaging magnification.

The above method adapts the shake compensation control imaging magnification βc to be smaller than the actual imaging magnification β when AF reliability is low by varying the gain coefficient K1 that is multiplied by the imaging magnification in response to the AF evaluation value. When AF reliability is high, control is executed so that the shake compensation control imaging magnification βc substantially coincides with the actual imaging magnification β. In this manner, excessive shake compensation for translational shake compensation can be prevented during operation prior to AF establishment or during a state when the object to be imaged is not in focus in relation to shake compensation control during focus driving by the AF operation. Therefore, shake compensation control for translational shake, in addition to rotational shake, is also realized during AF operations during imaging of moving images or the like.

Next, the effect of the present exemplary embodiment will be described making reference to FIG. 9A to FIG. 9D.

Figure 9:
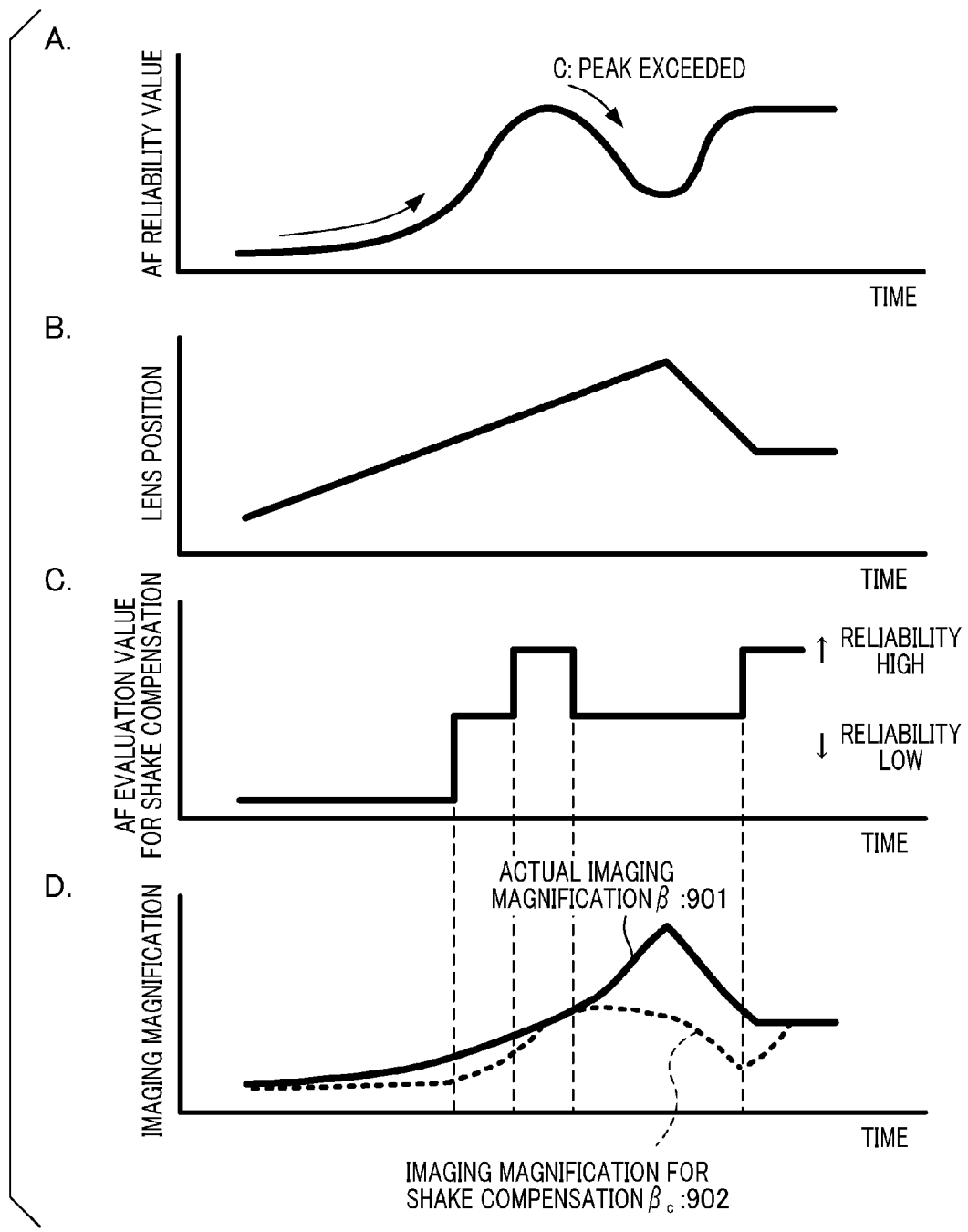
FIG. 9A to FIG. 9D illustrate an example of temporal variation in an AF evaluation value, lens position and imaging magnification.

FIG. 9A and FIG. 9B illustrate an example of variation in an AF evaluation value with displacement of the focal lens during AF operation. FIG. 9A is a graph that shows time on the horizontal axis and the AF evaluation value on the vertical axis. FIG. 9B is a graph that shows time on the horizontal axis and the position of the focal lens on the vertical axis.

In the graph shown in FIG. 9A, after the AF evaluation value at the time point denoted by C exceeds a peak value, since the value starts to decrease, the existence of a peak position (focal position) can be confirmed. As illustrated in FIG. 9B, after the lens displaces to the peak position of the AF evaluation value, the hill-climbing driving operation is completed and the operation shifts to a minute driving operation. On the other hand, when a peak in the AF evaluation value is not present and the value undergoes a monotonic decrease, since it can be determined that the direction of driving of the focal lens is not in a focusing direction, the direction of lens driving is reversed, and the hill-climbing driving operation is continued.

FIG. 9C illustrates an example of temporal variation in an AF evaluation value for shake compensation. In the present example, whether the reliability based on the AF evaluation value is high or low is determined by comparison with a plurality of threshold values, and the reliability level is set in a stepwise manner. Therefore, the temporal variation of the level has a stepwise configuration. In comparison with the reliability level, the K1 value of the variable gain unit 710 is varied as described with reference to FIG. 8A. FIG. 9D illustrates an example of temporal variation in the imaging magnification. The graph line 901 shown by the solid line indicates the actual imaging magnification β, that is to say, the output variation in the imaging magnification calculation unit 701 in FIG. 8A. The graph line shown by the broken line indicates the shake compensation control imaging magnification βc, that is to say, the output variation in the control imaging magnification calculation unit 702 in FIG. 8A. The shake compensation control imaging magnification βc calculated using the method described with reference to FIG. 8A varies to approach the imaging magnification β when the AF reliability is high, and varies to be smaller than the imaging magnification β when the AF reliability is low.

In still-image imaging mode, the user operates the release button 105, and when SW2 is in the ON state, shake compensation for imaging of a still image is performed. The imaging magnification β before imaging of a still image is used as the imaging magnification used for the translational shake compensation amount calculation and the rotational shake compensation amount calculation in S611 and S615 in FIG. 6. This is due to the fact that the shake compensation control imaging magnification βc calculated for imaging of moving images is associated with a delay in relation to the actual lens imaging magnification, or the imaging magnification is set to a small value to avoid excessive control. However, in the imaging of a still image, since imaging is executed after completion of AF operations, the imaging magnification obtained from the zoom and focus information 302 may be used without modification as the imaging magnification. That is to say, optimal shake compensation is executed in relation to imaging of a still image by identification of the imaging magnification β after completion of AF operations immediately before imaging and immediately after the SW2 is placed in the ON state, and inclusion of that imaging magnification β in the calculation of the rotational shake compensation amount and the translational shake compensation amount.

According to the first exemplary embodiment, a reduction in the shake compensation control performance associated with a sharp variation in the imaging magnification produced during AF operations can be mitigated, and thereby shake compensation control is enabled in relation to translational shake in addition to rotational shake also during AF operations for example during imaging of moving images.

Second Exemplary Embodiment

A second exemplary embodiment of the present invention will be described next. The points of difference from the first exemplary embodiment will be described below, reference will be made to the reference numerals already used in relation to the same constituent elements as those in the first exemplary embodiment and detailed description of those elements will not be repeated. The approach to omission of description in this manner will be also applied to the third exemplary embodiment described below.

Figure 10A:
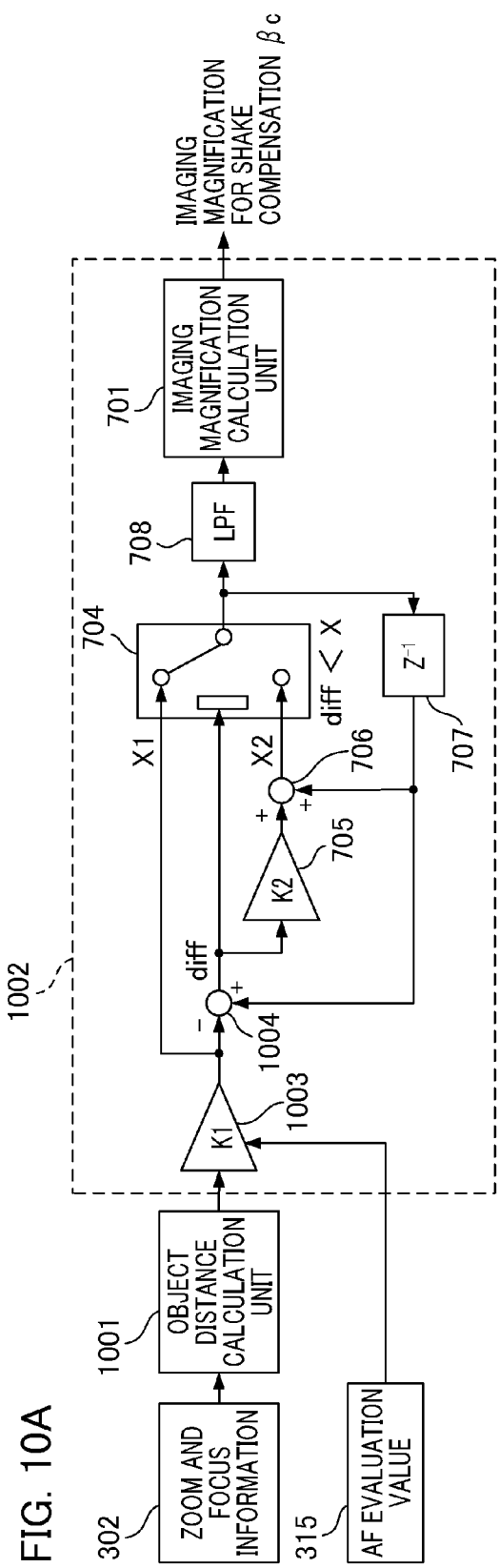
FIG. 10A is a block diagram describing a calculation process of an imaging magnification for shake compensation control in order to describe a second exemplary embodiment of the present invention in conjunction with FIG. 11.

FIG. 10A is a block diagram describing a calculation process unit for an imaging magnification for shake compensation in the rotational shake compensation coefficient calculation unit 313 and the translational shake compensation coefficient calculation unit 314 in a shake compensation control apparatus according to the second exemplary embodiment.

The second exemplary embodiment differs from the first exemplary embodiment in relation to the following points.

Firstly, the object distance calculation unit 1001 calculates the distance (object distance) from the image capturing apparatus to the object to be imaged by acquisition of the zoom and focal information 302. The control object distance calculation unit 1002 calculates the object distance used in shake compensation control (shake compensation control object distance). Although the configuration of the internal calculation of the control object distance calculation unit 1002 is substantially the same as the control imaging magnification calculation unit 702 illustrated in FIG. 8A, the variable gain unit 1003 and the subtraction unit 1004 are different.

Figure 10B:
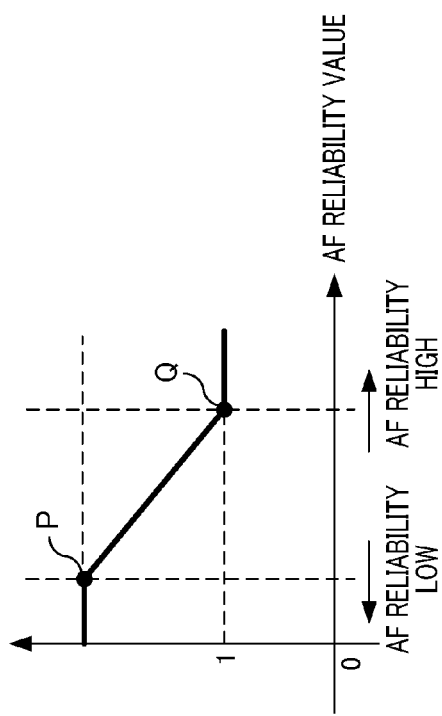
FIG. 10B illustrates the relationship between an AF evaluation value and gain.

The variable gain unit 1003 differs from the variable gain unit 710 in FIG. 8A by setting a gain coefficient K1 in response to the AF evaluation value in accordance with the gain table shown in FIG. 10B.

FIG. 10B is a graph illustrating an example of the relationship between an AF evaluation value on the horizontal axis and the gain coefficient K1 on the vertical axis. At a point P where the AF evaluation value is small and the reliability of AF is low, the K1 value is greater than 1. At a point Q where the AF evaluation value is large and the reliability of AF is high, the K1 value is 1. The line PQ has a negative gradient that slopes downwardly to the right. That is to say, the setting is adapted so that the K1 value increases as the AF evaluation value decreases and the AF reliability decreases, and conversely, the K1 value approaches 1 when the AF evaluation value increases and the AF reliability increases.

The positive or negative input by the subtracting device 1004 or the subtracting device 703 in FIG. 8A is reversed. That is to say, the output value of the variable gain unit 1003 is configured as a negative input for the subtracting device 1004, and the output value of the delaying device 707 is configured as a positive input value for the subtracting device 1004. This configuration is required in the calculation of the shake compensation control object distance in order to suppress sharp variation in a direction in which the object distance is decreased and to not suppress variation in a direction in which the object distance increases.

The shake compensation control object distance calculated by the control object distance calculation unit 1002 is output to the imaging magnification calculation unit 701 to thereby calculate the shake compensation control imaging magnification βc based on the object distance and the zoom position information. The focus position distance information used in shake compensation is calculated in the same manner, and is calculated using the shake compensation control object distance and the zoom position information.

According to the second exemplary embodiment, a variable setting for the gain coefficient K1 is enabled by multiplying by the object distance in response to the AF evaluation value. That is to say, when the AF reliability is low, the shake compensation control imaging magnification βc is controlled to be smaller than the actual imaging magnification β. Furthermore, when the AF reliability is high, the shake compensation control imaging magnification βc is controlled to approach the actual imaging magnification β. In this manner, excessive shake compensation for translational shake compensation can be prevented during AF operation prior to AF establishment or during a state when the object to be imaged is not in focus in relation to shake compensation control during focus driving by the AF operation. Therefore, shake compensation control for translational shake, in addition to rotational shake, is also realized during AF operations during imaging of moving images or the like.

Figure 11:
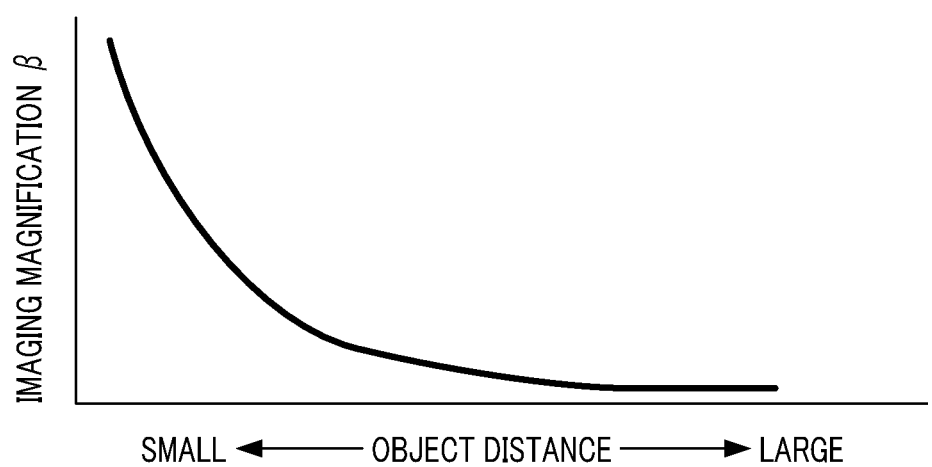
FIG. 11 illustrates a relationship between an imaging magnification and an object distance from the camera to the object to be imaged when a zoom position is fixed.

FIG. 11 illustrates variation in the imaging magnification and an object distance when a zoom position is fixed. The object distance is shown on the horizontal axis and the imaging magnification is shown on the vertical axis. The imaging magnification undergoes a sharp increase as the distance from the camera to the object to be imaged decreases. Since control to suppress a sharp variation in the object distance is executed in the second exemplary embodiment, the effect is obtained of suppressing sharp variation in the imaging magnification in comparison to calculation of the shake compensation control imaging magnification βc described in relation to the first exemplary embodiment.

Third Exemplary Embodiment

The third exemplary embodiment of the present invention will be described below.

FIG. 12A and FIG. 12B are block diagrams describing a calculation process of the shake compensation imaging magnification in the shake compensation control apparatus according to the third exemplary embodiment. FIG. 13A to FIG. 13D describe an example of temporal variation in a fluctuation amount calculated by a fluctuation state determination unit 1201.

There is a limit to the range for driving of the shake compensation unit 110 of the shake compensation control apparatus in order to compensate shake. As a result, although a high shake compensation effect is obtained by performance of shake compensation control within the variable range of the shake compensation unit 110, the shake compensation effect undergoes a sharp decrease when the variable range is exceeded. This is due to the fact that when the control limit (end portion of the variable range) of the shake compensation unit 110 is reached, driving to a further outer position is not possible. In particular, performance of an imaging operation when walking increases the amplitude of the rotational shake since the vibration due to the shaking of the body is transmitted to the image capturing apparatus.

In addition, the shake compensation control apparatus according to the present invention executes translational shake compensation in addition to rotational shake compensation executed by conventional configurations. Therefore when the translational shake compensation amount increases, the variable range is insufficient since a larger variable range is required for shake compensation. Furthermore, when shake is high and when searching for a peak value of the AF evaluation value during AF operations, the shake compensation amount will be excessive when the focus lens is driven in a direction in which the imaging magnification increases (shift to a close range side), and there is the possibility of an undesirable effect on the shake compensation effect of the shake compensation.

In this regard, the third exemplary embodiment calculates a compensation coefficient (correction coefficient) using the fluctuation state amount calculated using the rotational velocity meter and the variable degree amount of the AF evaluation value calculated from the frequency of the variable of the AF reliability, and thereby calculates the compensation amount for the shake compensation unit 110.

The operation of the fluctuation state determination unit 1201, the gain table 1202 and the variable gain unit 1203 will be described using FIG. 12A.

The fluctuation state determination unit 1201 that is configured to calculate a fluctuation state calculates a fluctuation state amount based on the rotational velocity detection signal from the rotational velocity meter 108$p$ and outputs the amount. The fluctuation state amount is an amount that indicates the configuration of the fluctuation state of the image capturing apparatus. The gain table 1202 produces a fluctuation state amount and a control signal for the gain (refer to K3) that is output to the variable gain unit 1203 in response to the variable degree amount of the AF evaluation value.

The calculation executed in an inner unit of the fluctuation state determination unit 1201 will be described below. Firstly, an absolute value calculation unit 1201$a$ calculates an absolute value of the rotational velocity detection signal from the rotational velocity meter 108$p$. Next, the absolute value signal passes through an LPF 1201$b$ to remove high frequency components that exceed the set cut-off frequency from the signal frequency components of the absolute value for the rotational velocity. That is to say, the signal of the low frequency components that are less than or equal to the cut-off frequency expresses the fluctuation state amount.

FIG. 13A describes an example of temporal variation in rotational velocity detection signal output from the rotational velocity meter 108$p$. FIG. 13B describes an example of temporal variation in the output signal from the absolute value calculation unit 1201$a$. FIG. 13C describes an example of temporal variation in fluctuation state amount that is output through the LPF 1201$b$. The amplitude amount of the rotational velocity detection signal during a period ΔTime1 is small. This indicates a small amount of camera shake similar to a photographer performing a careful imaging operation while holding the camera to avoid shake of the image capturing apparatus. An increase in the amplitude amount of the rotational velocity detection signal during the period ΔTime2 indicates extremely large camera shake, for example, when performing an imaging operation when walking. During the period ΔTime3, when the amplitude of the rotational velocity detection signal exhibits a value that is between the state during the period ΔTime1 and the state during the period ΔTime2, the amplitude amount of the rotational velocity detection is in an intermediate level. Although the amplitude amount of the rotational velocity detection signal is large during the period ΔTime4, this value indicates a state in which the image capturing apparatus is intentionally displaced for example when a photographer varies the composition of the image capturing apparatus.

The fluctuation state determination unit 1201 detects the fluctuation state amount as illustrated in FIG. 13C and determines whether or not the image capturing apparatus has an imaging state associated with large fluctuation such as when imaging is executed when walking. The ShakeLevel 1 to the ShakeLevel 4 as illustrated in FIG. 13C illustrate an example of a plurality of threshold values for the level of the fluctuation state amount.

FIG. 13D illustrates an example of the temporal variation for AF reliability. The variation frequency amount in the degree of focus is calculated by the AF signal processing unit (not illustrated) using a focus variation frequency amount calculation based on information indicating the degree of focus of the imaging optical system in relation to the object to be imaged. That is to say, the variable amount of the AF evaluation value in the present example is used as a variation frequency amount for the degree of focus.

In the period ΔTimeD1, since the ratio of the variation due to the AF reliability is low, it is determined that the variation amount of the AF evaluation value is small. Since the ratio of the variation related to AF reliability is comparatively large during the period ΔTimeD3, it is determined that the variation amount in the AF evaluation amount is large. During the period ΔTimeD2, although the ratio of the variation related to AF reliability is not of the level exhibited during the period ΔTimeD3, the relatively frequent variation results in a determination that the variation amount of the AF evaluation value is slightly large. When a process is executed in which the frequency of the variation rate of the AF evaluation value in a predetermined time is counted and calculated by determining whether or not the count value is greater than or equal to a predetermined threshold value, the variation amount of the AF evaluation value is determined for each predetermined time.

A value for the gain K3 of the variable gain unit 1203 is determined using the fluctuation state amount calculated as described above and the reference table for the gain table 1202 based on the variable amount related to the degree of AF reliability. FIG. 12B is a graph of the gain table used in the variable gain unit 1203. The first stage of the variable gain unit 710 is the same as the configuration described in the first exemplary embodiment (refer to FIG. 8B).

FIG. 12B is a graph illustrating an example of the relationship between a variation amount for an AF evaluation value on the horizontal axis and the gain coefficient K3 on the vertical axis. Furthermore, the gain table enables look up of the fluctuation state amount in addition to the variable amount for the AF evaluation value, and in the present example, illustrates the graph lines 1204 and 1207 that differ in response to the dimension of the four-stage fluctuation state amount. The correspondence relationship between each of graph lines for the ShakeLevel 1 to the ShakeLevel 4 as illustrated in FIG. 13C is as follows.

| Level of Fluctuation State Amount | Gain Table |
|---|---|
| ShakeLevel 1 | graph line 1204 |
| ShakeLevel 2 | graph line 1205 |
| ShakeLevel 3 | graph line 1206 |
| ShakeLevel 4 | graph line 1207 |

For example, when the fluctuation state amount is the ShakeLevel 4 illustrated in FIG. 13C, reference is made to the table illustrated by the graph line 1207. In a range in which the AF evaluation value is small and the variation amount of the AF evaluation value is small, the K3 value approaches 1. In a range in which the variation amount of the AF evaluation value is large, the K3 value is smaller than 1. The line illustrating the characteristics in an intermediate region has a positive gradient. The constant value (refer to the predetermined line portion) illustrated by the graph line 1207 in a range in which the variation amount of the AF evaluation value is small, the value is smaller than that illustrated by the graph line 1206. That is to say, the dimensional relationship of the value K3 in the corresponding range satisfies the relationship "graph line 1207<graph 1206<graph 1205<graph 1204". When less than or equal to ShakeLevel 1, the table illustrated by the graph line 1204 is looked up and when less than or equal to ShakeLevel 4, the table illustrated by the graph line 1207 is looked up. When greater than ShakeLevel 1 and smaller than ShakeLevel 4, a linear interpolation value is used. For example, when the size of the fluctuation state amount is between ShakeLevel 2 and ShakeLevel 3, the K3 value is calculated by linear interpolation using the graph line 1205 and the table 1206.

A gain coefficient value is set using the fluctuation state amount and the variation amount for the AF evaluation value to thereby determine a shake compensation imaging magnification and calculate the shake compensation amount. In the present exemplary embodiment, although the gain coefficient has been calculated based on the variation amount of the AF evaluation amount and the fluctuation state amount, either one of those amounts may be used.

In the third exemplary embodiment, the shake compensation amount can be reduced by reducing the gain coefficient value in a state in which the variation amount of the AF evaluation value is small, that is to say, in a state in which the AF result is not stable. In this manner, control can be performed to weaken the control amount for the shake compensation. Therefore, when the amplitude of rotational shake is like for example when performing an imaging operation when walking, and an AF operation is frequency executed to search for a peak value for an AF process, the shake compensation unit 110 is prevented from reaching the control limit, and therefore a reduction in shake compensation performance is prevented.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-147527 filed Jul. 1, 2011 which is hereby incorporated by reference herein in its entirety.

What is claimed is:

1. A shake compensation control apparatus comprising:
   a shake compensation unit;
   a detection unit configured to detect a shake amount of an apparatus including translational shake;
   a compensation amount calculation unit configured (i) to calculate a compensation coefficient by acquiring (a) the shake amount from the detection unit and (b) information indicating the degree of focus of an imaging optical system, and to (ii) calculate a compensation amount for the shake compensation unit; and
   a drive unit configured to drive the shake compensation unit in accordance with the compensation amount,
   wherein the compensation amount calculation unit reduces the compensation coefficient when there is a lower degree of focus.

2. The shake compensation control apparatus according to claim 1, comprising:
   a first detection unit configured to detect a rotational shake;
   a second detection unit configured to detect the translational shake;
   a first compensation coefficient calculation unit configured to calculate a compensation coefficient in relation to the rotational shake; and
   a second compensation coefficient calculation unit configured to calculate a compensation coefficient in relation to the translational shake,
   wherein the compensation amount calculation unit combines the compensation amount for the translational shake and the rotational shake calculated using the compensation coefficient and the detection signal from the first and the second detection units, and outputs to the drive unit.

3. The shake compensation control apparatus according to claim 2, wherein the first and the second compensation coefficient calculation unit vary the compensation coefficient by reducing a gain coefficient multiplied to the imaging magnification as the degree of focus decreases when calculating an imaging magnification for shake compensation by acquiring information for focus lens position and the zoom lens position of the imaging optical system.

4. The shake compensation control apparatus according to claim 2, wherein the first and the second compensation coefficient calculation unit vary the compensation coefficient by increasing the gain coefficient multiplied to the distance to the object to be imaged as the degree of focus decreases when calculating the distance to the object to be imaged by acquiring information for focus lens position and the zoom lens position of the imaging optical system.

5. The shake compensation control apparatus according to claim 1, wherein the shake compensation control apparatus is used in an image capturing apparatus configured to image still images and moving images;
   when imaging a moving image, the first and the second compensation coefficient calculation unit calculate the compensation coefficient by acquiring information for focus lens position and the zoom lens position of the imaging optical system and information indicating the degree of focus of the imaging optical system; and when imaging a still image, an imaging magnification for shake compensation control is calculated to obtain the compensation coefficient using information for focus lens position and the zoom lens position of the imaging optical system without reference to information indicating the degree of focus of the imaging optical system.

6. An image capturing apparatus comprising the shake compensation control apparatus according to claim 1.

7. A shake compensation control apparatus comprising:
a shake compensation unit;
a detection unit configured to detect a shake amount of an apparatus including translational shake;
a variation state amount calculation unit configured to calculate a variation state amount using the shake amount of the apparatus;
a focus amount variation frequency amount calculation unit configured to calculate a variation frequency amount in the degree of focus by acquiring information indicating a degree of focus of an imaging optical system;
a compensation amount calculation unit configured to calculate a compensation coefficient by acquiring (a) the shake amount from the detection unit, (b) information indicating the degree of focus, and (c) the variation frequency amount in the degree of focus, to calculate a compensation amount for the shake compensation unit; and
a drive unit configured to drive the shake compensation unit in accordance with the compensation amount,
wherein the compensation amount calculation unit reduces the compensation coefficient as the variation frequency amount in the degree of focus increases, or wherein the compensation amount calculation unit reduces the compensation coefficient as the variation state amount increases.

8. The shake compensation control apparatus according to claim 7, comprising:
a first detection unit configured to detect a rotational shake;
a second detection unit configured to detect the translational shake;
a first compensation coefficient calculation unit configured to calculate a compensation coefficient in relation to the rotational shake; and
a second compensation coefficient calculation unit configured to calculate a compensation coefficient in relation to the translational shake,
wherein the compensation amount calculation unit combines the compensation amount for the translational shake and the rotational shake calculated using the compensation coefficient and the detection signal from the first and the second detection units, and outputs to the drive unit.

9. The shake compensation control apparatus according to claim 8, wherein the first and the second compensation coefficient calculation unit vary the compensation coefficient by reducing the gain coefficient multiplied to the imaging magnification in response to a decrease in the degree of focus when calculating an imaging magnification for shake compensation control by acquiring information for focus lens position and the zoom lens position of the imaging optical system.

10. The shake compensation control apparatus according to claim 8, wherein the first and the second compensation coefficient calculation unit vary the compensation coefficient by increasing the gain coefficient multiplied to the distance to the object to be imaged in response to a decrease in the degree of focus when calculating the distance to the object to be imaged by acquiring information for focus lens position and the zoom lens position of the imaging optical system.

11. The shake compensation control apparatus according to claim 7, wherein the shake compensation control apparatus is used in an image capturing apparatus configured to image still images and moving images; when imaging a moving image, the first and the second compensation coefficient calculation unit calculate the compensation coefficient by acquiring information for focus lens position and the zoom lens position of the imaging optical system and information indicating the degree of focus of the imaging optical system; and
when imaging a still image, an imaging magnification for shake compensation control is calculated to calculate the compensation coefficient using information for focus lens position and the zoom lens position of the imaging optical system without reference to information indicating the degree of focus of the imaging optical system.

12. An image capturing apparatus comprising the shake compensation control apparatus according to claim 7.

13. A control method of shake compensation for compensating image shake by driving a shake compensation unit, the method comprising the steps of:
detecting a shake amount of an apparatus including translational shake;
(i) calculating a compensation coefficient by acquiring (a) the shake amount from the detection unit and (b) information indicating the degree of focus of the imaging optical system, and (ii) calculating a compensation amount for the shake compensation unit; and
driving the shake compensation unit in accordance with the compensation amount,
wherein in the step of calculating the compensation coefficient, the compensation coefficient is reduced when there is a lower degree of focus.

14. A control method of shake compensation for compensating image shake by driving a shake compensation unit, the method comprising the steps of:
detecting a shake amount of an apparatus including translational shake;
calculating a variation state amount using the shake amount of the apparatus;
calculating a variation frequency amount in the degree of focus by acquiring information indicating the degree of focus of the imaging optical system;
calculating a compensation coefficient by acquiring (a) the shake amount from the detection unit, (b) the variation state amount, (c) information indicating the degree of focus, and (d) the variation frequency amount in the degree of focus, to calculate a compensation amount for the shake compensation unit; and
driving the shake compensation unit in accordance with the compensation amount,
wherein in the step of calculating, the compensation coefficient is reduced as the variation frequency amount in the degree of focus increases, and the compensation coefficient is reduced as the variation state amount increases.

15. A shake compensation control apparatus comprising:
a shake compensation unit;
a detection unit configured to detect a shake amount of an apparatus including translational shake;
a compensation amount calculation unit configured to calculate a compensation amount for the shake compensation unit by acquiring (a) the shake amount from the detection unit, and (b) information indicating the degree of focus of an imaging optical system; and a drive unit configured to drive the shake compensation unit in accordance with the compensation amount, wherein the compensation amount calculation unit reduces a shake compensation control performance to decide the compensation amount when there is a lower degree of focus.

16. The shake compensation control apparatus according to claim 15, wherein the compensation amount calculation unit calculates the shake compensation control performance by acquiring (a) information for focus lens position and zoom lens position of the imaging optical system and (b) information indicating the degree of focus of the imaging optical system.

17. An image capturing apparatus comprising the shake compensation control apparatus according to claim 15.

18. A shake compensation control apparatus comprising:
a shake compensation unit;
a detection unit configured to detect a shake amount of an apparatus including translational shake;
a compensation amount calculation unit configured to calculate a compensation amount for the shake compensation unit by acquiring (a) the shake amount from the detection unit, and (b) information indicating the degree of focus of an imaging optical system; and
a drive unit configured to drive the shake compensation unit in accordance with the compensation amount,
wherein the compensation amount calculation unit reduces a gain coefficient to decide the compensation amount when there is a lower degree of focus.

19. The shake compensation control apparatus according to claim 18, wherein the detection unit comprises:
a first detection unit configured to detect a rotational shake; and
a second detection unit configured to detect the translational shake,
wherein the compensation amount calculation unit combines the compensation amount for the translational shake and the rotational shake calculated using the gain coefficient and the detection signal from the first and the second detection units, and outputs to the drive unit.

20. The shake compensation control apparatus according to claim 18, wherein the compensation amount calculation unit calculates the gain coefficient by acquiring (a) information for focus lens position and zoom lens position of the imaging optical system and (b) information indicating the degree of focus of the imaging optical system.

21. An image capturing apparatus comprising the shake compensation control apparatus according to claim 18.

22. A shake compensation control apparatus comprising:
a shake compensation unit;
a detection unit configured to detect a shake amount of an apparatus including translational shake;
a variation state amount calculation unit configured to calculate a variation state amount using the shake amount of the apparatus;
a focus amount variation frequency amount calculation unit configured to calculate a variation frequency amount in the degree of focus by acquiring information indicating a degree of focus of an imaging optical system;
a compensation amount calculation unit configured to calculate a compensation amount for the shake compensation unit by acquiring (a) the shake amount from the detection unit, (b) information indicating the degree of focus, and (c) the variation frequency amount in the degree of focus; and
a drive unit configured to drive the shake compensation unit in accordance with the compensation amount,
wherein the compensation amount calculation unit reduces a shake compensation control performance to decide the compensation amount as the variation frequency amount in the degree of focus increases, or wherein the compensation amount calculation unit reduces a shake compensation control performance to decide the compensation amount as the variation state amount increases.

23. An image capturing apparatus comprising the shake compensation control apparatus according to claim 22.

24. A shake compensation control apparatus comprising:
a shake compensation unit;
a detection unit configured to detect a shake amount of an apparatus including translational shake;
a variation state amount calculation unit configured to calculate a variation state amount using the shake amount of the apparatus;
a focus amount variation frequency amount calculation unit configured to calculate a variation frequency amount in the degree of focus by acquiring information indicating a degree of focus of an imaging optical system;
a compensation amount calculation unit configured to calculate a compensation amount for the shake compensation unit by acquiring (a) the shake amount from the detection unit, (b) information indicating the degree of focus, and (c) the variation frequency amount in the degree of focus; and
a drive unit configured to drive the shake compensation unit in accordance with the compensation amount,
wherein the compensation amount calculation unit reduces a gain coefficient to decide the compensation amount as the variation frequency amount in the degree of focus increases, or wherein the compensation amount calculation unit reduces a gain coefficient to decide the compensation amount as the variation state amount increases.

25. An image capturing apparatus comprising the shake compensation control apparatus according to claim 24.

26. A shake compensation control apparatus comprising:
a shake compensation unit;
a detection unit configured to detect a shake amount of an apparatus including translational shake;
a compensation amount calculation unit configured to calculate a compensation amount for the shake compensation unit by acquiring (a) the shake amount from the detection unit, and (b) information indicating the degree of focus of an imaging optical system; and
a drive unit configured to drive the shake compensation unit in accordance with the compensation amount,
wherein the compensation amount calculation unit calculates the compensation amount so that a shake compensation control performance to decide the compensation amount when there is a higher degree of focus is higher than a shake compensation control performance when there is a lower degree of focus.

27. The shake compensation control apparatus according to claim 26, wherein the compensation amount calculation unit calculates the shake compensation control performance by acquiring (a) information for focus lens position and zoom lens position of the imaging optical system and (b) information indicating the degree of focus of the imaging optical system.

28. An image capturing apparatus comprising the shake compensation control apparatus according to claim 26.

29. A shake compensation control apparatus comprising:
a shake compensation unit;
a detection unit configured to detect a shake amount of an apparatus including translational shake;
a compensation amount calculation unit configured to calculate a compensation amount for the shake compensation unit by acquiring (a) the shake amount from the detection unit, and (b) information indicating the degree of focus of an imaging optical system; and
a drive unit configured to drive the shake compensation unit in accordance with the compensation amount,
wherein the compensation amount calculation unit calculates the compensation amount so that a gain coefficient to decide the compensation amount when there is a higher degree of focus is higher than a gain coefficient to decide the compensation amount when there is a lower degree of focus.

30. The shake compensation control apparatus according to claim 29, wherein the detection unit comprises:
a first detection unit configured to detect a rotational shake; and
a second detection unit configured to detect the translational shake;
wherein the compensation amount calculation unit combines the compensation amount for the translational shake and the rotational shake calculated using the gain coefficient and the detection signal from the first and the second detection units, and outputs to the drive unit.

31. The shake compensation control apparatus according to claim 29, wherein the compensation amount calculation unit calculates the gain coefficient by acquiring (a) information for focus lens position and zoom lens position of the imaging optical system and (b) information indicating the degree of focus of the imaging optical system.

32. An image capturing apparatus comprising the shake compensation control apparatus according to claim 29.

33. A control method of shake compensation for compensating image shake by driving a shake compensation unit, the method comprising the steps of:
detecting a shake amount of an apparatus including translational shake;
calculating a compensation amount for the shake compensation unit by acquiring (a) the shake amount in the detecting step, and (b) information indicating the degree of focus of an imaging optical system; and
driving the shake compensation unit in accordance with the compensation amount,
wherein in the step of calculating a compensation amount, a shake compensation control performance to decide the compensation amount is reduced when there is a lower degree of focus.

34. A control method of shake compensation for compensating image shake by driving a shake compensation unit, the method comprising the steps of:
detecting a shake amount of an apparatus including translational shake;
calculating a compensation amount for the shake compensation unit by acquiring (a) the shake amount in the detecting step, and (b) information indicating the degree of focus of an imaging optical system; and
driving the shake compensation unit in accordance with the compensation amount,
wherein in the step of calculating a compensation amount, a gain coefficient to decide the compensation amount is reduced when there is a lower degree of focus.

35. A control method of shake compensation for compensating image shake by driving a shake compensation unit, the method comprising the steps of:
detecting a shake amount of an apparatus including translational shake;
calculating a variation state amount using the shake amount of the apparatus;
calculating a variation frequency amount in the degree of focus by acquiring information indicating a degree of focus of an imaging optical system;
calculating a compensation amount for the shake compensation unit by acquiring the (a) shake amount in the detecting step, (b) information indicating the degree of focus, and (c) the variation frequency amount in the degree of focus; and
driving the shake compensation unit in accordance with the compensation amount,
wherein in the step of calculating a compensation amount, a shake compensation control performance to decide the compensation amount is reduced as the variation frequency amount in the degree of focus increases, or wherein in the step of calculating a compensation amount, a shake compensation control performance to decide the compensation amount is reduced as the variation state amount increases.

36. A control method of shake compensation for compensating image shake by driving a shake compensation unit, the method comprising the steps of:
detecting a shake amount of an apparatus including translational shake;
calculating a variation state amount using the shake amount of the apparatus;
calculating a variation frequency amount in the degree of focus by acquiring information indicating a degree of focus of an imaging optical system;
calculating a compensation amount for the shake compensation unit by acquiring (a) the shake amount in the detecting step, (b) information indicating the degree of focus, and (c) the variation frequency amount in the degree of focus; and
driving the shake compensation unit in accordance with the compensation amount,
wherein in the step of calculating a compensation amount, a gain coefficient to decide the compensation amount is reduced as the variation frequency amount in the degree of focus increases, or wherein in the step of calculating a compensation amount, a gain coefficient to decide the compensation amount is reduced as the variation state amount increases.

37. A control method of shake compensation for compensating image shake by driving a shake compensation unit, the method comprising the steps of:
detecting a shake amount of an apparatus including translational shake;
calculating a compensation amount for the shake compensation unit by acquiring (a) the shake amount in the detecting step, (b) and information indicating the degree of focus of an imaging optical system; and
driving the shake compensation unit in accordance with the compensation amount,
wherein in the step of calculating a compensation amount, a shake compensation control performance to decide the compensation amount when there is a higher degree of focus is higher than a shake compensation control performance to decide the compensation amount when there is a lower degree of focus.

38. A control method of shake compensation for compensating image shake by driving a shake compensation unit, the method comprising the steps of:

detecting a shake amount of an apparatus including translational shake;

calculating a compensation amount for the shake compensation unit by acquiring (a) the shake amount in the detecting step, and (b) information indicating the degree of focus of an imaging optical system; and driving the shake compensation unit in accordance with the compensation amount, wherein in the step of calculating a compensation amount, a gain coefficient to decide the compensation amount when there is a higher degree of focus is higher than a gain coefficient to decide the compensation amount when there is a lower degree of focus.

\* \* \* \* \*